US011164464B1

(12) United States Patent
Marriott et al.

(10) Patent No.: US 11,164,464 B1
(45) Date of Patent: Nov. 2, 2021

(54) OPTIMIZING TRAJECTORY OF UNMANNED AERIAL VEHICLES

(71) Applicant: Facebook, Inc., Menlo Park, CA (US)

(72) Inventors: Jack Marriott, Thousand Oaks, CA (US); Birce Tezel, Redwood City, CA (US); Zhang Liu, Oak Park, CA (US); Nicolas E. Stier-Moses, Palo Alto, CA (US); Julian Diego Mestre, Palo Alto, CA (US)

(73) Assignee: FACEBOOK, INC., Menlo Park, CA (US)

( * ) Notice: Subject to any disclaimer, the term of this patent is extended or adjusted under 35 U.S.C. 154(b) by 249 days.

(21) Appl. No.: 16/549,234

(22) Filed: Aug. 23, 2019

Related U.S. Application Data

(60) Provisional application No. 62/742,849, filed on Oct. 8, 2018.

(51) Int. Cl.
*G08G 5/00* (2006.01)
*B64C 39/02* (2006.01)
*G05D 1/04* (2006.01)

(52) U.S. Cl.
CPC ......... *G08G 5/0034* (2013.01); *B64C 39/024* (2013.01); *G05D 1/042* (2013.01); *G08G 5/0039* (2013.01); *G08G 5/0069* (2013.01); *B64C 2201/042* (2013.01); *B64C 2201/06* (2013.01); *B64C 2201/122* (2013.01)

(58) Field of Classification Search
CPC .. G08G 5/0034; G08G 5/0039; G08G 5/0069; B64C 39/024; B64C 2201/042; B64C 2201/06; B64C 2201/122; G05D 1/042
See application file for complete search history.

(56) References Cited

U.S. PATENT DOCUMENTS

| | | | | |
|---|---|---|---|---|
| 9,412,278 | B1 * | 8/2016 | Ming Gong | G08G 5/0039 |
| 9,524,648 | B1 * | 12/2016 | Gopalakrishnan | G08G 5/0082 |
| 10,424,209 | B2 * | 9/2019 | Borgyos | G08G 5/0039 |
| 10,964,220 | B2 * | 3/2021 | Heiberg | G08G 5/0039 |

\* cited by examiner

*Primary Examiner* — Thomas G Black
*Assistant Examiner* — Anthony M Gartrelle
(74) *Attorney, Agent, or Firm* — Keller Jolley Preece

(57) ABSTRACT

The present disclosure is directed toward methods, non-transitory computer-readable media, and systems for trajectory optimization in a high-altitude, long-endurance aircraft. For example, the systems described herein can generate an optimized flight plan for an aircraft during active flight of the aircraft by utilizing a greedy algorithm with buffering. In one or more embodiments, the systems described herein identify a plurality of possible states and select a predetermined number of the top possible states (based on energy change associated with transitioning to each possible state) at each incremental time period within a flight time window starting from an initial state to a plurality of possible states for a final incremental time period. Furthermore, in some embodiments, the systems described herein select a final state based on a final energy associated with the final state and determine a flight plan for the aircraft from the initial state to the selected final state.

20 Claims, 12 Drawing Sheets

OPTIMIZING TRAJECTORY OF UNMANNED AERIAL VEHICLES

CROSS REFERENCE TO RELATED APPLICATIONS

This application claims the benefit of, and priority to, U.S. Provisional Patent Application Ser. No. 62/742,849, filed on Oct. 8, 2018. The entire contents of the foregoing application are hereby incorporated by reference.

BACKGROUND

Recent years have seen significant development in aircraft design. For example, developers have recently created high-altitude, long-endurance aircraft to provide improved digital communication capabilities. For instance, developers have generated solar-powered, high-altitude, long-endurance aircraft that provide internet connectivity in regions without other viable means of internet access. Stringent operational constraints for such implementations, however, place demanding requirements on every aircraft subsystem. For instance, the need for long endurance requires superior control systems and trajectory planning. However, conventional systems are slower than necessary to be used for in-flight planning.

More specifically, high-altitude, long-endurance aircrafts utilize trajectory planning to remain in-flight for an indefinite (or an extensive) amount of time. Indeed, oftentimes, the flight plan must account for changes in the flight environment to continuously keep the aircraft in-flight. However, conventional systems oftentimes cannot calculate such flight plans in-flight (e.g., in real-time) because performing these calculations require large amounts of processing resources and/or execution time. For instance, some conventional systems may require over an hour to calculate a flight plan for a thirty-minute flight window. Thus, some conventional systems calculate flight plans for high-altitude, long-endurance aircrafts before active flight of the aircraft. Such flight plans are often inaccurate because they do not account for changes in the flight environment during flight. As a result, conventional systems often calculate flight plans that are less accurate over longer periods of time and, due to the lack of accuracy, will have less flight endurance.

SUMMARY

One or more embodiments described herein provide benefits and/or solve one or more of the foregoing and other problems in the art with systems, methods, and non-transitory computer-readable media for trajectory optimization in high-altitude, long-endurance aircraft. For example, as set forth in greater detail below, the disclosed systems increase the computational speed and efficiency of aircraft control systems, facilitating in-flight planning for high-altitude, long-endurance aircraft. In particular, some embodiments disclosed herein provide an in-flight planning system that runs faster than real-time. For instance, in one or more embodiments, the disclosed systems generate, while in-flight, a trajectory plan for a high-altitude, long-endurance aircraft that maximizes the energy storage of the aircraft after traveling during a flight time window (e.g., 15-minutes, 30-minutes, 1-hour, 24-hours, etc.) to remain in flight for an extensive amount of time.

To illustrate, in one or more embodiments, the disclosed systems identify an initial state of an unmanned aerial vehicle ("UAV"). Indeed, the initial state of the UAV can include an indication of an initial energy of the UAV and an initial position of the UAV. Once the initial state is identified, the disclosed systems can identify a plurality of possible states of the UAV that represent the state of the UAV after travelling, based on the set of possible command inputs, for a first incremental time period from the initial state.

Similarly, the disclosed systems identify subsequent possible states of the UAV after the UAV travels during a subsequent incremental time period from the first incremental time period or other preceding incremental time periods. Indeed, in order to enable identification of these possible states during active flight, the disclosed systems utilize a greedy algorithm that selects a predetermined number of possible states, based on a calculated energy change for each possible state, and identifies subsequent possible states from only the selected predetermined number of possible states. The disclosed systems can repeat this process for any number of subsequent incremental time periods in a flight time window. Moreover, the disclosed systems select a final state (that indicates the highest amount of energy storage for the UAV upon completion of the flight time window) after identifying all of the possible states of the UAV, from each set of selected predetermined number of possible states at each incremental time period in the flight time window. Then, the disclosed systems determine a set of states representing a path from the initial state of the UAV to the selected final state of the UAV (and corresponding command inputs) to determine an optimized trajectory that maximizes the energy storage of the UAV after traveling during a flight time window (e.g., a time window of 30-minutes, 24-hours, etc.) to keep the UAV in flight continuously.

BRIEF DESCRIPTION OF THE DRAWINGS

The detailed description is described with reference to the accompanying drawings in which.

DETAILED DESCRIPTION

Figure 1:
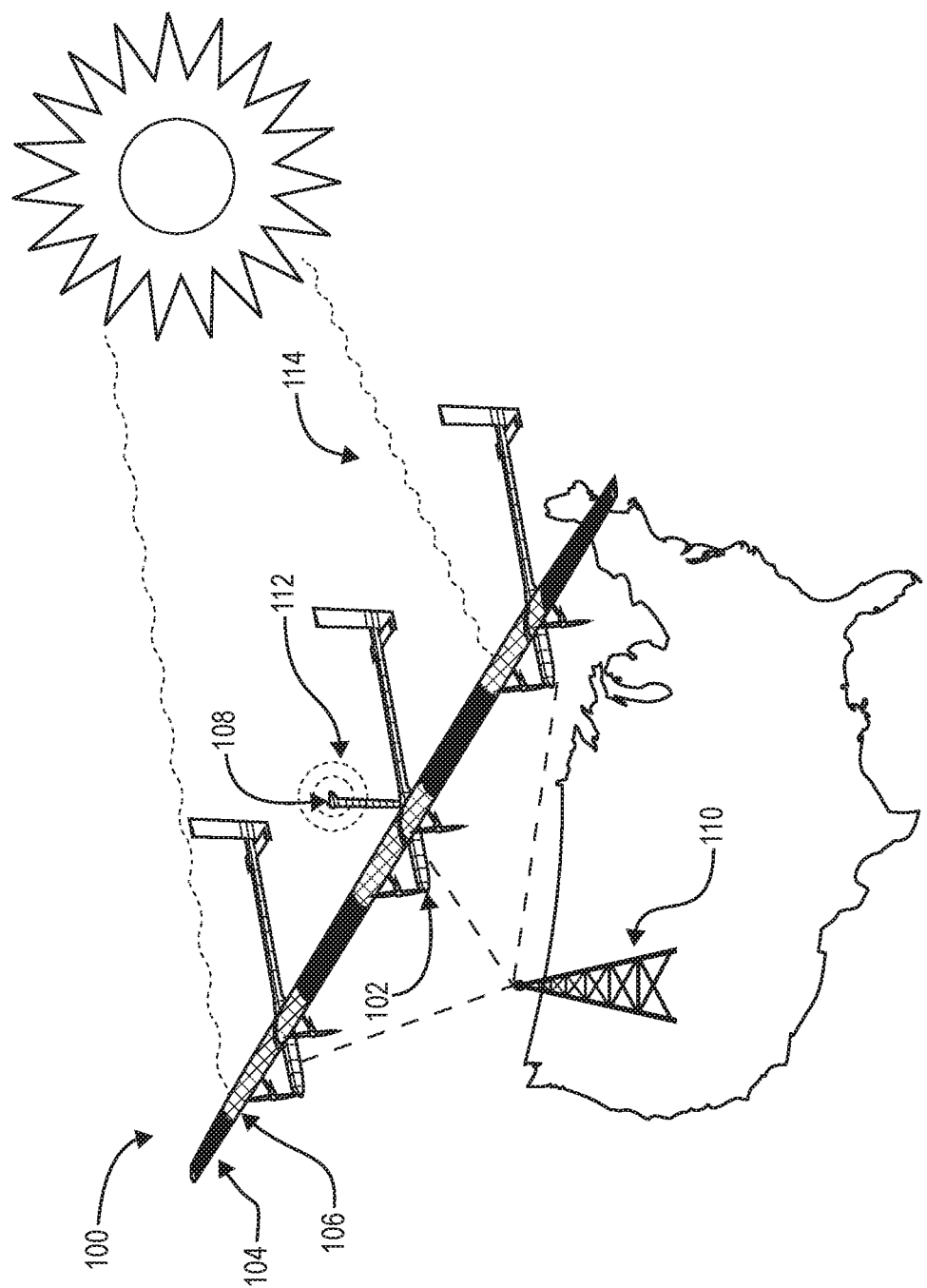
FIG. 1 illustrates an environment in which a UAV operates in accordance with one or more embodiments.

This application discloses various embodiments of a trajectory control system, computer readable media, and corresponding methods that increase the computational speed and accuracy of aircraft control systems to facilitate in-flight trajectory planning that maximizes energy storage in a high-altitude, long-endurance aircraft during a flight time window. In one or more embodiments, the trajectory control system utilizes a greedy algorithm that stores a predetermined number of top possible states (based on a calculated energy change corresponding to each state) during each incremental time period and calculates subsequent possible states of the aircraft for each subsequent incremental time period from the predetermined number of top possible states to identify a flight plan that maximizes the energy storage of the aircraft after traveling during the flight time window. In some embodiments, the calculated energy change is based on an amount of energy generated by one or more solar panels of the aircraft and the amount of energy utilized by the aircraft during a corresponding incremental time period. As such, the trajectory control system can accurately and quickly calculate, during active flight, a trajectory plan that maximizes energy storage of the aircraft to enable the aircraft to continuously remain in flight (e.g., a trajectory that maximizes the aircraft's exposure to the sun while consuming the least power/energy to remain in flight).

To illustrate, in one or more embodiments, the trajectory control system identifies an initial state of a UAV (i.e., a type of high-altitude, long-endurance aircraft) and calculates a set of possible states for the UAV from the initial state. In particular, the initial state of the UAV can include an indication of an initial energy of the UAV (e.g., the initial available energy) and an initial position of the UAV. Moreover, once the initial state is identified, the trajectory control system utilizes a set of possible command inputs for the UAV (e.g., inputs that instruct the course of the UAV) to identify a plurality of possible states of the UAV that represent the state of the UAV after travelling, based on the set of possible command inputs, for a first incremental time period from the initial state. Indeed, each of the identified plurality of possible states include a calculated change in energy of the UAV (either positive or negative) to transition to the possible state.

Then, in one or more embodiments, the trajectory control system identifies a set of subsequent possible states of the UAV (branching from the plurality of possible states identified in the first incremental time period) for any number of subsequent incremental time periods in a flight time window. In order to limit the number of possible states that are calculated for the UAV and to enable calculation of these possible states during active flight, the trajectory control system can select a predetermined number of the top possible states (based on a calculated energy change for each state) at each incremental time period while identifying possible states of the aircraft for each incremental time period within a flight time window.

For example, the trajectory control system can select a predetermined number of possible states from the plurality of possible states identified in the first incremental time period based on the calculated change in energy that is associated with each possible state (e.g., select the possible states that results in the least negative change and/or gain in energy for the UAV to transition to the possible state). Furthermore, the trajectory control system identifies a set of subsequent possible states of the UAV (based on possible command inputs) for a subsequent incremental time period from the predetermined number of possible states from the first incremental time period. Indeed, the trajectory control system can repeatedly select a predetermined number of top subsequent possible states (based on the calculated energy change for each possible state) for each subsequent possible state of the UAV and identify the next set of possible states from those predetermined number of top subsequent possible states for each subsequent incremental time period.

After identifying the possible states for each incremental time period in the flight time window, the trajectory control system can select a final state that results in the most stored (and/or least loss of) energy for the UAV after the UAV travels during the flight time window. Based on the selected final state, the trajectory control system can identify a set of states (and corresponding command inputs to transition to each of the set of states) that represents a path between the initial state of the UAV and the selected final state of the UAV to determine an optimized flight plan for the UAV. Indeed, the trajectory control system can generate such a flight plan a plurality of times while the UAV is in active flight to update the flight plan (or trajectory) of the UAV to keep the UAV in-flight continuously.

The disclosed trajectory control system provides many advantages and benefits relative to conventional systems. Specifically, by utilizing a greedy algorithm in accordance with one or more embodiments herein, the trajectory control system can generate an optimized flight plan with less execution time relative to conventional systems (e.g., with faster computational speeds). For example, in some embodiments, the trajectory control system generates an optimized flight plan for a one-hour flight window in under two minutes. Consequently, the trajectory control system can, due to the improved computational speeds, generate an optimized flight plan during active flight of a UAV. Consequently, in some embodiments, the trajectory control system generates a flight plan in real-time.

Furthermore, the trajectory control system utilizes less computational resources and, therefore, generates an optimized flight plan with more efficiency compared to some conventional systems. For instance, by utilizing the greedy algorithm in accordance with one or more embodiments herein, the trajectory control system can generate the optimized flight plan while identifying less possible states (e.g., calculations and/or identifications for a subsequent incremental time period are performed from the predetermined number of selected possible states of a preceding incremental time period, based on the calculated energy change). As a result, the trajectory control system utilizes less computational resources and/or processing power to generate a flight plan compared to some conventional systems. Indeed, by utilizing less computational resources and/or processing power, in some embodiments, the trajectory control system can utilize less energy and/or resources of a UAV when generating a flight plan for the UAV.

Moreover, as a result of faster computational times and less processing requirements, the trajectory control system can generate the flight plan during active flight and can generate a flight plan for a plurality of times. Indeed, by generating the flight plan during active flight with the increased computational speeds and less processing requirements, the trajectory control system can generate a flight plan that accounts for changes in the flight environment. Since the trajectory control system can generate a flight plan that accounts for changes in the flight environment (e.g., during active flight), the flight plan is more accurate compared to some conventional systems because the flight plan can utilize a new trajectory when the original trajectory no longer provides an optimal and/or adequate energy capacity at the end of the flight plan. As such, the trajectory control system can generate flight plans that more accurately maximize energy storage for a UAV and keeps the UAV in-flight for an increased amount of time.

As illustrated by the foregoing discussion, the present disclosure utilizes a variety of terms to describe features and benefits of the trajectory control system. Additional detail is hereafter provided regarding the meaning of these terms as used in this disclosure. For instance, as used herein, the term "unmanned aerial vehicle" (sometimes referred to as a "UAV") refers to an aircraft that can be operated remotely and/or autonomously. In particular, the term "unmanned aerial vehicle" refers to an aircraft that can be operated remotely and/or autonomously through onboard computers without the physical presence of a person onboard the aircraft. For example, a UAV is a remote and/or autonomous aircraft that can be used for multiple purposes (e.g., surveillance, weather monitoring, providing digital communication services such as internet connectivity to regions, aerial research, agriculture, military, etc.). In one or more embodiments, the UAV is an aerial vehicle that includes a wing that spans from one or more fuselages, solar panels, one or more batteries, various electronic components, and/or various sensors and/or receivers for flight control, monitoring, and/or conducting another purpose. The UAV can also include a computing device that allows the UAV to operate various aspects of a flight mission such as, but not limited to, taking off, flight, conducting the purpose of the UAV, and landing. Although, the embodiments herein describe the trajectory control system for a UAV, the trajectory control system can be utilized in any type of vehicle to optimize a trajectory plan for the vehicle.

Furthermore, as used herein, the term "state" refers to information that represents one or more aspects related to a UAV. In particular, the term "state" refers to information that represents any of and/or any combination of mechanical, diagnostic, flight, system, and/or positional information. For instance, the state of a UAV can include information such as, but not limited to, an indication of velocity, directional offsets, heading angles, altitude, energy storage, maximum energy storage capacity, solar panel conditions, time and day information, weather conditions, structural and/or system information, other flight parameters, other UAV related characteristics (e.g., dynamics and/or kinematics of a UAV), and/or other environmental characteristics. For example, the state of the UAV can include an indication of east and north offsets of the UAV, altitude of the UAV, heading angle of the UAV, stored energy of the UAV, and airspeed of the UAV.

As used herein, the term "flight time window" refers to a time duration for a flight plan. In particular, the term "flight time window" refers to a range of time that represents a start time and an end time for a flight plan for a UAV. In one or more embodiments, the flight time window is a time duration that is less than the actual total flight time of a UAV (e.g., a segment of the total flight time). For example, the flight time window can be represented in any unit of time such as, but not limited to, seconds, minutes, and/or hours. Furthermore, the flight time window can include one or more incremental time periods.

As used herein, the term "incremental time period" refers to a segment of time within a flight time window. In particular, the term "incremental time period" refers to a discretized amount of time within a range of time (e.g., a flight time window). The incremental time period can be represented with any unit of time, including but not limited to, seconds, minutes, and/or hours. For instance, an incremental time period can include a ten second time segment within a flight time window of one hour (i.e., a flight window of one hour can have 360 incremental time periods of ten second each).

As used herein the term "flight plan" (sometimes referred to as a "trajectory plan") refers to information that represents a course (e.g., a route) for a UAV. In particular, the term "flight plan" refers to information that represents a selected (or identified) route for a UAV during a duration of time (e.g., flight time window). For example, a flight plan can include a set of states and/or command inputs that enable the UAV to travel to positions represented in the set of states for more than one incremental time period within a flight time window. Indeed, the flight plan can include a set of states that enable a UAV to travel from an initial state (or position) to a final state (position) by transitioning between the set of states (in a determined sequence or path) within the flight time window. In accordance with one or more embodiments, the flight plan can be a route for a UAV that maximizes the stored energy of the UAV at the end of the flight time window.

As used herein the term "energy change" (sometimes referred to as "change in energy") refers to an increase or decrease in the amount of stored energy of a UAV. In particular the term "energy change" refers to a numerical representation of the increase or decrease in the amount of stored energy of a UAV during flight of the UAV. For example, an energy change can include a value that indicates a 1% decrease in stored battery energy of a UAV during flight of the UAV over an incremental time period. Furthermore, as an example, the energy change can include a value that indicates a 2% increase in the stored battery energy when solar panels of the UAV generate energy during flight of the UAV over an incremental time period.

As used herein the term "energy storage" (sometimes referred to as "energy storage capacity," "energy source," or "stored energy") refers to an amount of energy available to a UAV. In particular, the term "energy storage" refers to an amount of energy available as a source of power (e.g., electricity and/or potential energy). In one or more embodiments the stored energy also refers to an amount of energy available from an energy container (e.g., a battery) of a UAV. For example, in one or more embodiments, energy storage includes the amount of energy stored in one or more batteries within the UAV that are capable of storing the energy and/or converting the energy into electricity. Indeed, the energy storage can increase and/or decrease based on energy generated by components of the UAV (e.g., a solar panel), the power utilized by a UAV to operate mechanisms (or other components) of the UAV (e.g., an engine, sensors, other mechanical systems, and/or other computer systems), and/or potential energy of the UAV (e.g., gravitational potential energy).

As used herein the term "path" refers to a sequence of elements that are ordered by time. In particular, the term "path" refers to a sequence of states (of the UAV) that are ordered by time from an initial state to a final state. For example, a path can include a one or more possible states of a UAV that are ordered by the incremental time periods in a flight time window to represent the transition of a UAV from an initial state to a final state (that is calculated by the trajectory control system). Furthermore, in a computed tree structure, the term path can include a sequence of nodes along edges of a tree structure. Additionally, as used herein the term "tree structure" refers to a data structure that includes nodes and edges that represents one or more data points as nodes and one or more costs (or weights) to achieve the data points as edges.

As used herein the term "command input" refers to information that represents an instruction that causes a UAV to perform one or more functions. In particular, the term command input refers to instructions provided to a UAV that causes the UAV to perform one or more functions related to flight of the UAV (e.g., autopilot functions). For example, command inputs can include, but are not limited to, values that represent a change in heading angle and a change in altitude for a UAV. Indeed, in one or more embodiments, a UAV can receive a command input and perform one or more mechanical, electrical, and/or computational functions to achieve the instructions represented by the command input.

As used herein the term "solar panel" (sometimes referred to as a "solar cell," "photovoltaic array," or "PV array") refers to a surface that utilizes sun rays to generate energy. In particular, the term "solar panel" refers to a surface (or panel) that includes photovoltaic modules (e.g., crystalline silicon cells or thin-film cells) to absorb light energy from the Sun to generate electricity. For example, a solar panel includes wing panels affixed to and/or part of a wing assembly that include photovoltaic modules to absorb light energy from the sun to generate electricity for a UAV.

As used herein the term "containment region" (sometimes referred to as "containment area" or a "geostationary containment volume") refers to a space that represents a virtual (and/or artificial) zone. In particular, the term "containment region" refers to a space that represents a virtual zone of flight for a UAV. For example, a containment region can include a zone represented by a radius, an upper altitude limit (e.g., ceiling altitude), and a lower altitude limit (e.g., an altitude floor) in which a UAV must remain. In some embodiments, the trajectory control system can associate a penalty to a possible state and/or a change in energy value associated with the possible state when a possible state indicates the UAV in a position outside of the containment region. Additionally, in one or more embodiments, the containment region can be a space represented by a three-dimensional boundary.

As used herein the term "penalty" refers to a weight that modifies a state and/or an energy change value to represent an infeasibility of a command input. In particular, the term "penalty" refers to a weighted value that causes a possible state and/or an energy change value calculated by the trajectory control system to be represented as a lower (or higher) value to reduce the likelihood of selecting the possible state and/or energy change value for a flight plan for a UAV.

Additional detail will now be given in relation to illustrative figures portraying exemplary embodiments. To aid in the description of trajectory control system, a flight mission of the UAV, and a flight (or trajectory) plan of the UAV, an overview of a flight mission of the UAV and a flight plan for the UAV are first described in reference to FIGS. 1 and 2. One will appreciate that the configuration of the UAV, the flight mission of the UAV, and the flight plan for the UAV are exemplary embodiments and the later trajectory control system can operate with a variety of UAVs, flight missions, and/or flight plans.

As mentioned above, a UAV can be, remotely or autonomously, used for multiple purposes. Indeed, a UAV can be a high-altitude, long-endurance aerial vehicle used for purposes such as, but not limited to, providing digital communication services. Moreover, a flight mission for a high-altitude, long-endurance UAV can include taking off, conducting the purpose of the UAV in flight for an indefinite (or an extensive) amount of time, and landing. For example, FIG. 1 illustrates a UAV 100, with a trajectory control system 102, in-flight and providing internet connectivity to a region without other viable means of internet access while generating energy from solar panels 106 on a wing assembly 104.

Indeed, as shown in FIG. 1, the UAV 100 conducts a long-term flight mission above a determined region and provides internet connectivity to the region through communication components in a payload mast 108 of the UAV 100. In some embodiments, the UAV 100 can stay inflight over a region for a prolonged amount of time, such as three months, to provide internet connectivity to a region through communication components in the payload mast 108 before having to land to refuel and/or recharge the energy storage of the UAV. For example, as shown in FIG. 1, the UAV 100 can connect to a communication source 110 and provide internet connectivity to a region by emitting an internet signal 112 from the payload mast 108 over the region.

In one or more embodiments, the UAV 100 can remain in flight for prolonged periods of time by utilizing rechargeable batteries to operate the UAV 100, the solar panels 106, and optimized flight plans generated by the trajectory control system 102. Indeed, the UAV 100 can, while in flight, generate energy for the batteries of the UAV 100 by utilizing the solar panels 106. For example, as shown in FIG. 1, the UAV 100 includes the solar panels 106 on the wing assembly 104 of the UAV 100. Furthermore, the solar panels 106 generate energy from solar rays 114 in order to recharge batteries onboard the UAV 100. Indeed, in some embodiments, the UAV 100 can utilize one or more generated flight plans from the trajectory control system 102 to ensure that the batteries onboard the UAV 100 result in enough energy during each 24-hour cycle to remain in flight for a prolonged amount of time.

Figure 2:
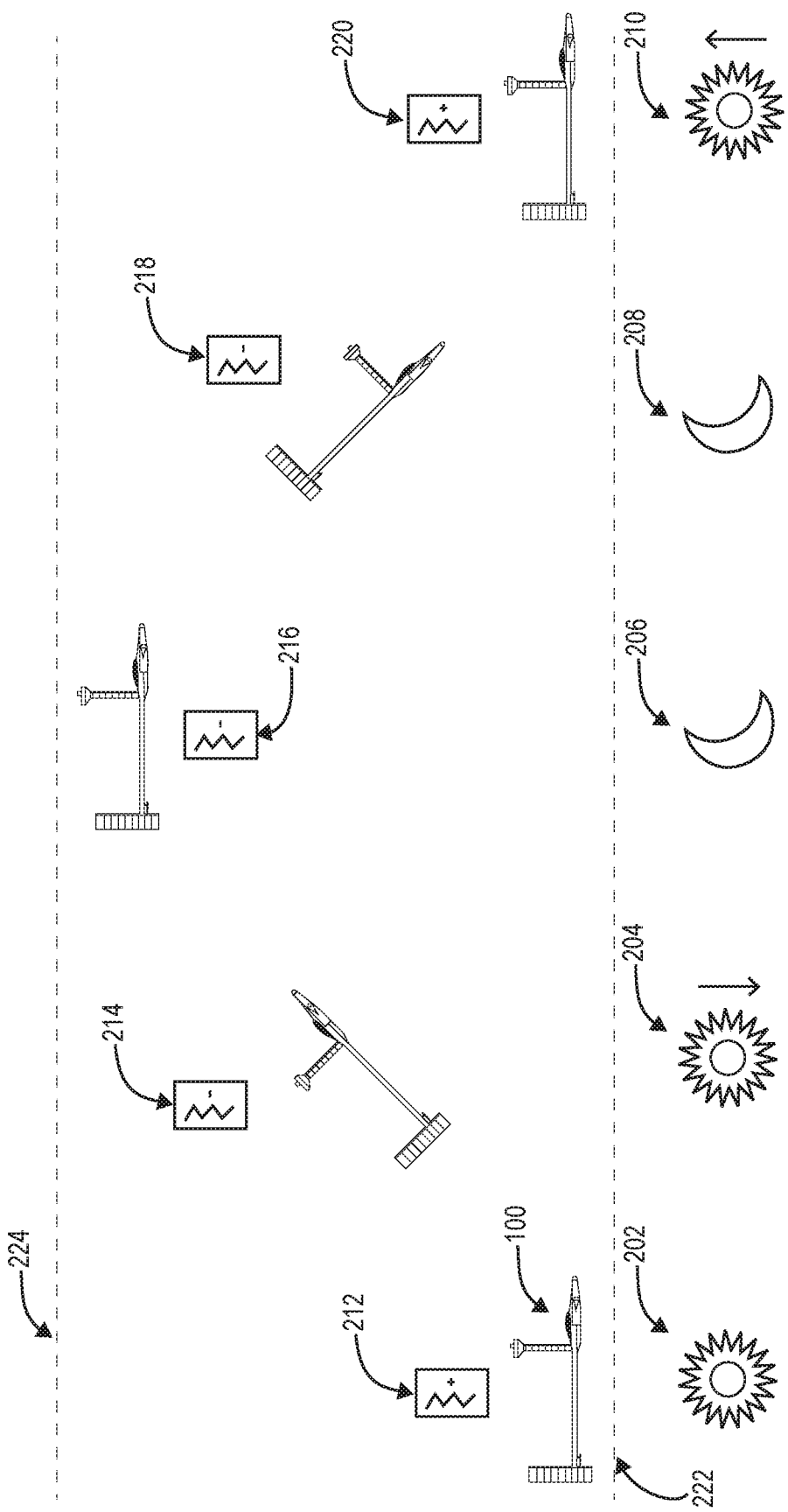
FIG. 2 illustrates an example flight plan for a UAV in accordance with one or more embodiments.

As mentioned above, the trajectory control system 102 can generate a trajectory plan for a UAV that maximizes the energy storage of the UAV after traveling during a flight time window (e.g., 24 hours) to remain in flight for an extensive amount of time. For instance, FIG. 2 illustrates events of an exemplary flight plan that can be generated by the trajectory control system 102. In particular, FIG. 2 illustrates time phases within a 24-hour cycle and possible command inputs associated with the time phases from an exemplary flight plan generated by the trajectory control system 102 in accordance with one or more embodiments herein. For instance, as shown in FIG. 2, the trajectory control system 102 can generate a flight plan that causes the UAV 100 to perform one or more actions during different portions of the day to maximize energy storage of the UAV 100. Indeed, FIG. 2 illustrates a flight plan for the UAV 100 during various phases (e.g., daytime, sunset, nighttime, and sunrise) in a 24-hour cycle.

As shown in FIG. 2, the trajectory control system 102 can generate a flight plan that instructs the UAV 100 to charge the energy storage of the UAV 100 during a daytime phase 202. In one or more embodiments, the trajectory control system 102 can generate a flight plan that instructs the UAV 100 to align along the sun (e.g., to the solar azimuth) in order to maximize the amount of energy generated by the solar panels of the UAV 100. Furthermore, the generated flight plan can instruct the UAV 100 to slightly climb or descent (in altitude) to maintain an optimal angle between the solar panels of the UAV 100 and the sun. Indeed, as shown in FIG. 2, the trajectory control system 102 generates a flight plan that nets a positive energy change 212 for the UAV 100 during the daytime phase 202. In one or more embodiments, the trajectory control system 102 generates a flight plan that attempts to result in an excess amount of energy for the UAV 100 during the daytime phase 202 in order to sustain flight during other phases in which the UAV 100 cannot generate energy (e.g., via solar panels). Furthermore, as shown in FIG. 2, during the start of a daytime phase 202, the UAV 100 can be at an altitude closer to an altitude floor 222 because of instructions from the trajectory control system 102 to glide downwards to conserve energy during a nighttime phase from a previous 24-hour cycle.

Furthermore, as shown in FIG. 2, the trajectory control system 102 can generate a flight plan that instructs the UAV 100 to climb in altitude during a sunset phase 204. Indeed, the UAV 100 can climb in altitude to reach a ceiling altitude 224 while netting a negative energy change 214 for the UAV 100. Indeed, the trajectory control system 102 can generate a flight plan that instructs the UAV 100 to climb steadily during the daytime phase 202, climb at a steep bank angle during the sunset phase 204, or any other combination that nets the least negative change in energy for the UAV 100. In some embodiments, the trajectory control system 102 generates a flight plan that instructs the UAV 100 to achieve a high-altitude during the sunset phase 204 because the UAV 100 may not generate energy during the sunset and/or other phases in the 24-hour cycle and will have to rely on gliding to conserve energy.

After the sunset phase 204, the flight plan generated by the trajectory control system 102 can instruct the UAV 100 to remain in an idle power mode and glide during a nighttime phase 206. As shown in FIG. 2, the flight plan generated by the trajectory control system 102 can instruct the UAV 100 to glide at the smallest possible bank angle to remain airborne without utilizing energy to provide propulsion to the UAV 100 during a nighttime phase 206. Indeed, as illustrated in FIG. 2, the generated flight plan may result in a negative net change in energy 216 for the UAV 100 during the nighttime phase 206 (i.e., due a lack of sunlight and no energy generation from the solar panels), however the negative net change in energy 216 is minimal since the UAV 100 is instructed to remain in an idle power mode. Similarly, as shown in FIG. 2, the flight plan generated by the trajectory control system 102 can instruct the UAV 100 to remain in an idle power mode and glide (at the smallest possible bank angle) towards the altitude floor 222 to minimize the negative net change in energy 218 for the UAV 100 through a pre-dawn nighttime phase 208.

Upon reaching towards the altitude floor 222 and the sunrise phase 210, the generated flight plan from the trajectory control system 102 can instruct the UAV 100 to dwell (e.g., any combination of gliding and/or providing enough power to components of the UAV 100 to maintain a desired altitude) until there is enough sun exposure to charge the batteries of the UAV 100. Indeed, until there is enough sun exposure to charge the batteries, the generated flight plan can result in a negative net change in energy for the UAV 100 during the sunrise phase 210. Furthermore, once there is enough sun exposure to charge the batteries of the UAV 100, the flight plan can result in a positive net change in energy 220 for the UAV 100.

Additionally, although FIG. 2 illustrates a 24-hour cycle flight time window (e.g., completion of phases 202-210), the trajectory control system 102 can generate a flight plan that provides instructions to a UAV 100 for multiple 24-hour cycles (or any other amount of time). Indeed, the trajectory control system 102 can generate a flight plan that instructs the UAV 100 to continue operating in a similar course that enables the UAV 100 to charge the batteries of the UAV 100 to a maximum charge during the daytime phase and glide to minimize battery usage during a nighttime phase for any number of repeating phases (e.g., a flight time window of longer than 24-hours).

Furthermore, as mentioned above, the trajectory control system 102 can update the flight plan to ensure that the UAV 100 is flying within an optimal path that maximizes energy storage of the UAV 100 during active flight. Indeed, the trajectory control system 102 can generate a flight plan during active flight at any time to update the existing flight plan for greater accuracy (e.g., account for changes in the flight environment and/or the UAV). For example, referring to FIG. 2, the trajectory control system 102 can generate a flight plan after each occurrence of a sunrise phase 210 (or any other phase) for the next flight time window (e.g., 24-hour cycle). Moreover, due to the increased computational efficiency and speed acquired by the trajectory control system 102, the trajectory control system 102 can generate a flight plan at each phase of the day and/or in real-time. As such, the trajectory control system 102 can generate a flight plan for the UAV that continues to update after a specified time cycle (e.g., at each hour, a 12-hour cycle, a 24-hour cycle, etc.) to provide a more accurate path that maximizes energy storage of the UAV 100 during active flight to keep the UAV 100 in flight for a longer duration of time.

As mentioned above, the trajectory control system 102 increases the computational speed and efficiency of generating a flight plan that maximizes energy storage in a UAV to facilitate in-flight trajectory planning and, as a result, sustains the flight of a UAV for a longer duration of time. Indeed, the trajectory control system 102 increases the computational speed and efficiency of generating a flight plan for a UAV by utilizing a greedy algorithm to identify an optimal flight plan in accordance with one or more embodiments described below. For example, FIG. 3 illustrates an overview of the trajectory control system 102 by illustrating the trajectory control system 102 performing acts to generate an optimized flight plan and provide the flight plan to a UAV.

Figure 3:
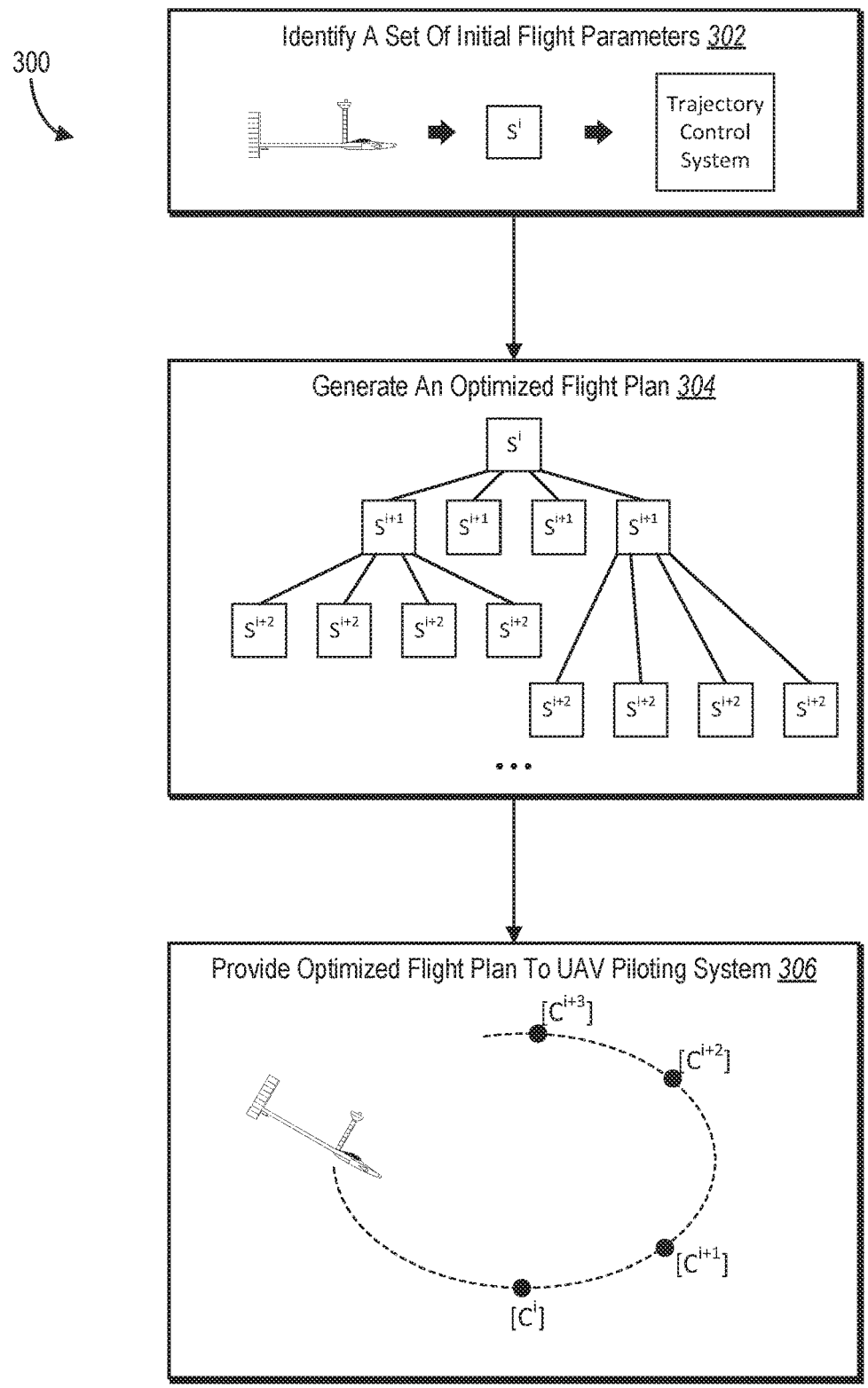
FIG. 3 illustrates a flow chart of providing a flight plan to a UAV in accordance with one or more embodiments.

As illustrated in FIG. 3, the trajectory control system 102 can perform an act 302 of identifying an initial state of a UAV. For example, in one or more embodiments, the trajectory control system 102 receives data for an initial state to utilize as a starting point for generating a trajectory plan for a flight time window. In some embodiments, the trajectory control system 102 receives data for an initial state from one or more components of the UAV 100. For example, the trajectory control system 102 can receive data from components such as, but not limited to, a flight control component and a power management component. Indeed, in one or more embodiments, the trajectory control system 102 receives data such as velocity, altitude, weather conditions, and/or other flight parameters from flight control components of the UAV 100 (e.g., computer systems for piloting the UAV and/or sensors of the UAV). Furthermore, in some embodiments, the trajectory control system 102 receives data such as energy availability (e.g., battery charge), energy source health (e.g., battery health), solar panel conditions, and/or energy usage of the UAV.

Additionally, the trajectory control system 102 can utilize data from a previous flight plan for an initial state of the UAV 100. In particular, in one or more embodiments, the trajectory control system 102 obtain data from a flight plan (that has been previously generated by the trajectory control system 102 or stored on the UAV 100) to identify an initial state for the UAV 100. For example, the trajectory control system 102 identifies a state of the UAV 100 corresponding to a future time from an existing flight plan (e.g., a flight plan generated by the trajectory control system 102 that includes identified states of the UAV at one or more future incremental time periods). Additionally, in some embodiments, the trajectory control system 102 utilizes the identified state from the previous flight plan as the initial state of the UAV 100 to generate the next flight plan for the UAV 100.

As mentioned above, the initial state (or other states) of the UAV 100 can include information such as, but not limited to, velocity, altitude, battery life, solar panel conditions, time and day, weather conditions, structural and/or system damage information, flight parameters, other UAV related characteristics, and/or other environmental characteristics. In one or more embodiments, the trajectory control system 102 represents a state of the UAV 100 as a vector. For example, the trajectory control system 102 can represent a state of the UAV 100 that includes an east offset ($p_e^i$), a north offset ($p_n^i$), an altitude ($h^i$), a heading angle ($\psi^i$), a stored battery energy ($E_b^i$), and an airspeed ($V_a^i$) of the UAV 100 as a vector ($S^i$): $S^i=(p_e^i, p_n^i, h^i, \psi^i, E_b^i, V_a^i)$ for each incremental time period (i). Indeed, as described in greater detail in FIG. 4A, the trajectory control system 102 can utilize the various information represented in the state vector of the UAV 100 to calculate the position, trajectory, and/or energy change of the UAV 100 at one or more incremental time periods based on possible command inputs for the UAV 100.

Moreover, as illustrated in FIG. 3, the trajectory control system 102 can perform an act 304 of generating an optimized flight plan for a UAV. For instance, in one or more embodiments, the trajectory control system 102 generates an optimized flight plan for the UAV 100 beginning from the initial state identified in act 302. Furthermore, the trajectory control system 102 is configured to generate a flight plan for the UAV 100 for any provided flight time window and can generate any number of flight plans for the UAV 100. As mentioned above, in one or more embodiments, the trajectory control system 102 facilitates generating a flight plan for the UAV 100 in-flight by utilizing a greedy algorithm, that improves the computational speed and efficiency of generating a flight plan, when identifying possible states for multiple incremental time periods within a selected flight time window. The trajectory control system 102 identifying possible states of the UAV 100 based on possible command inputs and determining an optimized flight plan for the UAV 100 by utilizing a greedy algorithm is described in greater detail in FIGS. 4 and 5.

Additionally, as shown in FIG. 3, the trajectory control system 102 can perform an act 306 of providing an optimized flight plan to a UAV. For example, the trajectory control system 102 can provide information such as the command inputs corresponding to the selected possible states from a flight plan generated in act 304 to the UAV 100. Indeed, as discussed in greater detail in FIG. 6, the trajectory control system 102 can provide a set of command inputs (e.g., represented as $C^i, C^{i+1}, \ldots, C^{i+4}$) that enable the UAV 100 to transition from the initial state to each selected state for each incremental time period within a flight plan. In one or more embodiments, the trajectory control system 102 represents the command inputs as a vector ($C^i$), represented as $C^i=(\Delta\psi^i, \Delta h^i)$, which includes a change in heading angle ($\Delta\psi^i$) for the UAV 100 and a change in altitude ($\Delta h^i$) for the UAV 100 for each incremental time period (i). As shown in FIG. 3, the trajectory control system 102 can provide a set of command inputs to the UAV 100 and the UAV 100 can operate (via systems that operate autopilot functionalities) as instructed by the command inputs at each incremental time period (i) of the provided flight plan.

Figure 4A:
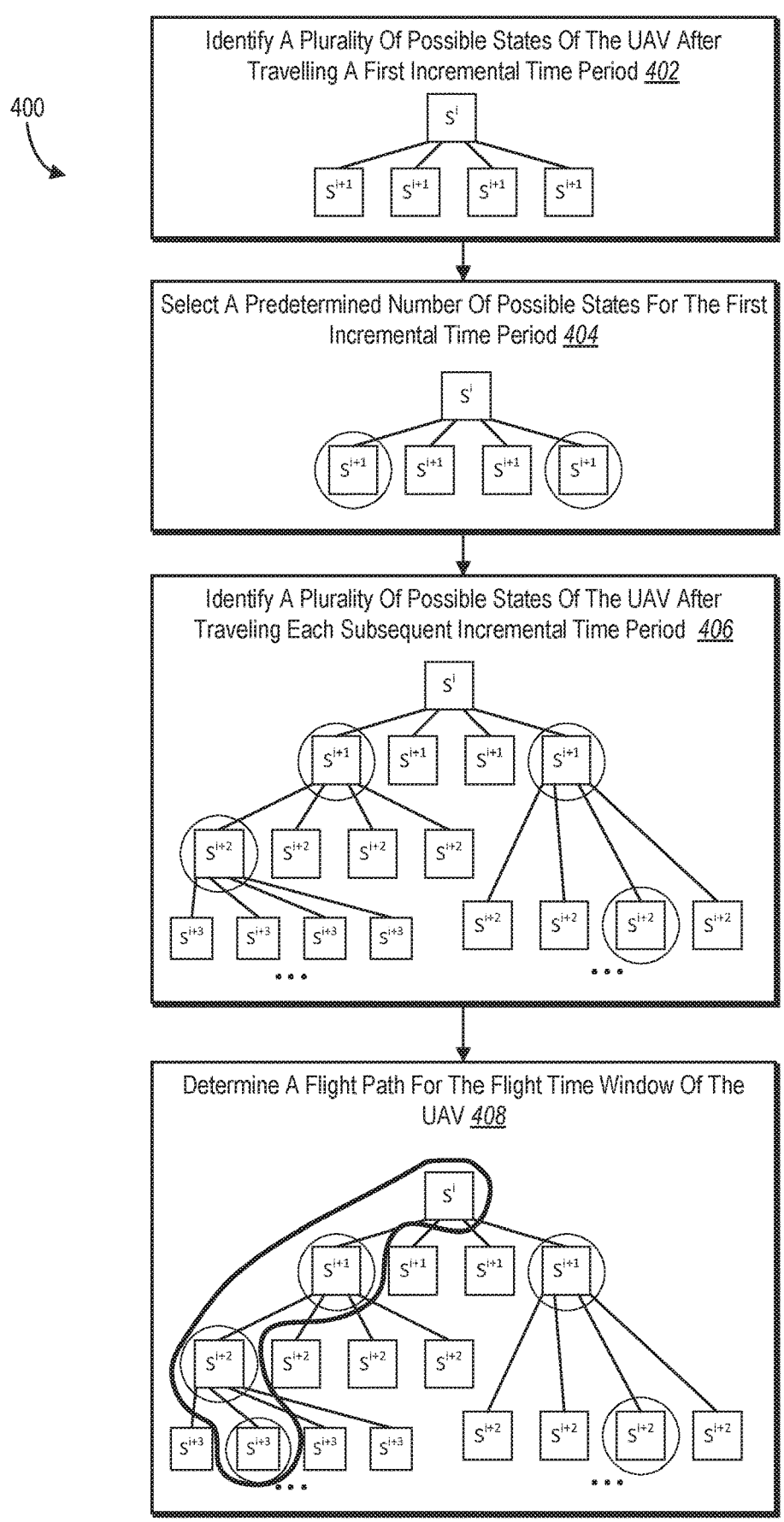
FIG. 4A illustrates a flow chart of generating a flight plan for a UAV in accordance with one or more embodiments.

As mentioned above, the trajectory control system 102 can quickly and efficiently generate an optimized flight plan for a UAV during active flight of the UAV. For instance, in one or more embodiments, the trajectory control system 102 generates a flight plan by computing energy change and other trajectory information for a set of possible command inputs for one or more incremental time periods within a flight time window of the flight plan. Furthermore, the trajectory control system 102 utilizes a greedy algorithm at each incremental time period based on energy change to improve the speed and efficiency of computing an optimized flight plan that maximizes energy storage of a UAV during active flight of the UAV. Indeed, FIG. 4A illustrates the trajectory control system 102 identifying possible states of the UAV 100, based on possible command inputs, and utilizing a greedy algorithm to determine an optimized flight plan for the UAV 100.

In one or more embodiments, as mentioned above, the trajectory control system 102 generates an optimized flight plan that maximizes energy storage of a UAV. In particular, in some embodiments, the trajectory control system 102 generates an optimized flight plan that maximizes the total energy stored in the UAV 100, after executing the flight plan, subject to constraints that correspond to information of the UAV 100 (e.g., the dynamics and/or kinematics of the UAV 100), station keeping of the UAV 100, and/or command input limits at particular states of the UAV 100.

In particular, in one or more embodiments, the trajectory control system 102 generates a flight plan for the UAV 100 by, in a non-convex constrained optimization problem, minimizing $E_b+kE_p$ subject to $\dot{x}(t)=f(x(t), u(t), w(t))$ and the limit $g(x(t), u(t))\leq 0$ for each state vector ($\dot{x}(t)$) of the UAV 100 for each time (t) (e.g., for each incremental time period). In some embodiments, the variable $E_b$ refers to the energy stored in the battery of the UAV 100. In some embodiments, the variable $E_p$ refers to potential energy from sources such as solar energy (via solar panels). Furthermore, in one or more embodiments, the variable $E_p$ refers to energy stored as gravitational potential energy of the UAV 100. Additionally, in one or more embodiments, the parameter k refers to a weighting constant that amplifies the potential energy during the daytime.

Moreover, in some embodiments, x(t) represents time-domain signals for the states of the trajectory control system 102, u(t) represents the inputs to the trajectory control system 102 (e.g., the command inputs), and w(t) represents the external disturbances. For example, as mentioned above, the state vector x(t) can include, but is not limited to, the position, velocity, altitude, and stored battery energy (e.g., the battery state-of-charge) of the UAV 100. Furthermore, the input vector u(t) can include optimization variable such as, but not limited to, the yaw rate command, the vertical velocity (e.g., altitude rate) command, and the airspeed command. Additionally, the disturbance vector w(t) can include values for, but is not limited to, wind, gust, turbulence, sensor noise, and modeling uncertainties. Furthermore, the trajectory control system 102 can utilize the inequality constraint $g(x(t), u(t))\leq 0$, mentioned above, to capture the upper and lower limits of the command input (u(t)) and other station keeping requirements.

For instance, as illustrated in FIG. 4A, the trajectory control system 102 can perform an act 402 of identifying a plurality of possible states of a UAV after traveling a first incremental time period from an identified initial state of the UAV. In particular, after identifying an initial state of the UAV 100, the trajectory control system 102 identifies one or more possible command inputs for the UAV 100 that can be taken from the initial state. Additionally, the trajectory control system 102 utilizes the one or more possible command inputs to identify a plurality of possible states of the UAV 100 after traveling a first incremental time period from the identified initial state of the UAV 100 using the possible command inputs. For instance, the trajectory control system 102 can identify a plurality of possible states of the UAV 100 that can be utilized to identify the position, trajectory, and/or energy change of the UAV 100 after traveling the first incremental time period from the initial state of the UAV 100.

In one or more embodiments, the trajectory control system 102 utilizes a simulation model to capture behavior of the UAV 100 with one or more possible states by providing a response to a set of control inputs (e.g., command inputs). In particular, the trajectory control system 102 can utilize a simulation model that calculates (or identifies) a resulting state of the UAV 100 based on a calculation of how a flight control system of the UAV 100 will respond to command inputs. Indeed, in some embodiments, the trajectory control system 102 utilizes a closed loop autopilot system (e.g., the flight control system) that responds to command inputs, maintains the stability of the UAV 100, and guarantees a response akin to that of a first order differential equation (e.g., for calculating energy change and/or trajectory information of the UAV 100). Indeed, in one or more embodiments, the trajectory control system 102 utilizes the simulation model (as described herein) to identify a state of the UAV 100 without differentials and/or with maintained accuracy when larger changes in time are utilized.

For instance, in one or more embodiments, the trajectory control system 102 can calculate (or identify or determine) the kinematics, navigation, aerodynamics, irradiance (e.g., power per unit area received from the sun), power and propulsion, energy change, and other environmental factors for a time-period (e.g., an incremental time-period). Furthermore, the trajectory control system 102 can utilize the calculated information mentioned above to identify a state of the UAV 100 and the energy change associated with the state of the UAV 100 after traveling to the state after an incremental time-period. For example, in one or more embodiments, the trajectory control system 102 utilizes command inputs to update the state of the UAV 100 and to calculate (or determine) information such as, the energy change and/or trajectory information mentioned above (e.g., the kinematics, navigation, aerodynamics, irradiance, power and propulsion, energy change, and other environmental factors).

In particular, in some embodiments, the trajectory control system 102 determines the vertical and directional responses of the UAV 100 based on autopilot functionalities of the UAV 100 with the command inputs. Indeed, the trajectory control system 102 can determine the resulting actions and/or conditions of the UAV 100 when command inputs are executed within the autopilot functionality of the UAV 100 (e.g., based on simulated computations). In particular, in one or more embodiments, the UAV 100 is controlled by any of and/or any combination of longitudinal, lateral/directional, and/or vertical command inputs. For instance, in one or more embodiments, the command inputs include equivalent airspeed ($V_e$), yaw rate ($R_{cmd}$), and vertical velocity ($V_{v,cmd}$). Indeed, in some embodiments, the UAV 100 utilizes the command inputs mentioned above to calculate an updated altitude and an updated heading angle for the UAV 100 after traveling an incremental time period. Furthermore, in some embodiments, the trajectory control system 102 utilizes a constant equivalent airspeed ($V_e$) when determining the updated altitude and the updated heading angle for the UAV 100. Additionally, in one or more embodiments described herein, the superscript i indicates the incremental time period during which the referenced variables are updated by the trajectory control system 102.

For example, in one or more embodiments, the trajectory control system 102 calculates the updated altitude (h) at an incremental time period (i) by utilizing the equation $h^i = h^{i-1} + \Delta h^i \Delta T$. For instance, the trajectory control system 102 can calculate a change in altitude rate ($\Delta h^i$) utilizing $\Delta h^i = k_h V_{v,cmd}^i$. In one or more embodiments, as mentioned above, represents a command input for the vertical velocity for incremental time period i. Furthermore, in some embodiments, $k_h$ represents a non-dimensional factor that accounts for the dynamics of the vertical response (e.g., in the presence of a step command, a stable first order dynamic system representative of the altitude response rises 33.6 percent in a ten second time step). The trajectory control system 102 can calculate (or determine) the updated altitude ($h^i$) after the UAV 100 travels for an incremental time period (e.g., from incremental time period i−1 to i) by calculating the altitude change after travelling for the incremental time period ($\Delta T$) for a vertical velocity rate ($\Delta h^i$) and adding the change in altitude to the previous altitude ($h^{i-1}$).

Furthermore, in some embodiments, the trajectory control system 102 calculates the updated heading angle ($\psi$) at an incremental time period (i) by utilizing the equation $\psi^i = \psi^{i-1} + \Delta \psi^i \Delta T$. For example, the trajectory control system 102 can calculate a change in heading angle rate utilizing $\Delta \psi^i = k_\psi R_{cmd}^i$. In some embodiments, as mentioned above, $R_{cmd}^i$ represents a command input for the yaw rate for incremental time period i. Additionally, in one or more embodiments, $k_\psi$ represents a non-dimensional factor that accounts for the dynamics of the directional response. Indeed, the trajectory control system 102 can calculate (or determine) the updated heading angle ($\psi^i$) after the UAV 100 travels for an incremental time period (e.g., from incremental time period i−1 to i) by calculating the heading angle change after travelling for the incremental time period ($\Delta T$) for a change in heading angle rate ($\Delta \psi^i$) and adding the change in heading angle to the previous heading angle ($\psi^{i-1}$). In one or more embodiments, the trajectory control system 102 limits the command inputs to the change in heading angle and the change in altitude.

Additionally, the trajectory control system 102 can calculate a true velocity of the UAV 100. For example, in one or more embodiments, the trajectory control system 102 calculates a true velocity (or airspeed) of the UAV 100 at an incremental time period i by utilizing the equation $$V_a^i = V_e^i \sqrt{\rho_0 / \rho^i}.$$

In particular, in some embodiments, although the trajectory control system 102 utilizes a constant equivalent airspeed $V_e^i$ (that is provided as a command input), the true airspeed ($V_a^i$) varies with changing altitude. For instance, in some embodiments, the air density ρ varies with altitude and, in turn, changes the true airspeed $V_a^i$. Moreover, in some embodiments, the air density is constant at sea level $\rho_0$.

In some embodiments, the trajectory control system 102 calculates (or identifies) the kinematic properties of the UAV 100 after travelling for an incremental time period i. For instance, in one or more embodiments, the trajectory control system 102 utilizes the change in altitude rate ($\Delta h^i$) and the true airspeed ($V_a^i$) to calculate the inertial flight path angle of the UAV 100. In particular, the trajectory control system 102 can utilize the equation sin $$\gamma^i = \frac{\Delta h^i}{V_a^i}$$

to calculate the inertial flight path angle, represented as $\gamma^i$, at an incremental time period i. Furthermore, the trajectory control system 102 can calculate the bank (or banking) angle of the UAV 100 by utilizing the change in heading rate ($\Delta\psi_i$), the true airspeed ($V_a^i$), and acceleration due to gravity (g). More specifically, in some embodiments, the trajectory control system 102 utilizes the equation $\tan \phi^i = \Delta\psi^i V_a^i/g$ to calculate the bank angle, represented as $\phi^i$, at an incremental time period i.

Furthermore, the trajectory control system 102 can calculate (or determine) the North and East positions (e.g., the North and East offsets) on a local horizontal plane for the UAV 100. For instance, when the bank angle $\phi^i$ equals 0, the trajectory control system 102 calculates the North offset ($p_n^i$) and the East offset ($p_e^i$) by utilizing the equation:

$$\begin{bmatrix} p_e^i \\ p_n^i \end{bmatrix} = \begin{bmatrix} p_e^{i-1} \\ p_n^{i-1} \end{bmatrix} + V_a^i \Delta T \begin{bmatrix} \sin\Delta\psi^i \\ \cos\Delta\psi^i \end{bmatrix}.$$

In one or more embodiments, the first part of the equation above, $$\begin{bmatrix} p_e^{i-1} \\ p_n^{i-1} \end{bmatrix},$$

represents the North and East offset from a preceding incremental time period (i−1). Further, as mentioned above, in one or more embodiments, the $V_a^i$ represents the true airspeed, $\Delta T$ represents the change of time between incremental time periods i and i−1, and $\psi^i$ represents the updated heading angle at incremental time period i.

Additionally, when the bank angle $\phi^i$ does not equal 0, the trajectory of the UAV 100 is curved with radius $\rho_c^i$ and instantaneous center of rotation at position $P_c^i$. Indeed, the trajectory control system 102 can calculate $\rho_c^i$ by utilizing the equation $\rho_c^i = (V_a^i)^2/\tan \phi^i$. Furthermore, the trajectory control system 102 can calculate $P_c^i$ by utilizing the equation:

$$P_c^i = \begin{bmatrix} p_e^{i-1} \\ p_n^{i-1} \end{bmatrix} + \rho_c^i \begin{bmatrix} \cos\psi^i \\ -\sin\psi^i \end{bmatrix}.$$

Moreover, in one or more embodiments, the trajectory control system 102 utilizes $\rho_c^i$; and $P_c^i$ to calculate (or determine) the North and East offsets. For instance, in one or more embodiments, when the bank angle $\phi^i$ does not equal 0, the trajectory control system 102 calculates the North and East offset positions by utilizing the equation:

$$\begin{bmatrix} p_e^i \\ p_n^i \end{bmatrix} = P_c^i - \rho_c^i \begin{bmatrix} \cos\Delta\psi^i & \sin\Delta\psi^i \\ -\sin\Delta\psi^i & \cos\Delta\psi^i \end{bmatrix} \begin{bmatrix} \cos\psi^i \\ -\sin\psi^i \end{bmatrix}.$$

Furthermore, in one or more embodiments, the trajectory control system 102 identifies information for navigation. For example, in one or more embodiments, the trajectory control system 102 identifies (or determines) the geodetic latitude ($\varphi$) and longitude ($\lambda$) from the computed flat Earth positions on a World Geodetic System 1984 reference. In some embodiments, the trajectory control system 102 utilizes the geodetic latitude ($\varphi$) and longitude ($\lambda$) to estimate solar angles.

In some embodiments, the trajectory control system 102 also calculates the thrust (T) of the UAV 100. For instance, in one or more embodiments, the trajectory control system 102 utilizes an aerodynamic lift force (L) of the UAV 100, a coefficient of lift ($c_L$), an estimated angle of attack ($\alpha$), an estimated coefficient of drag ($c_D$) to calculate thrust (T). For example, the trajectory control system 102 can calculate the aerodynamic lift force (L) from the sum of perpendicular forces. In particular, the trajectory control system 102 can utilize the equation $L/\cos \phi - W \cos \gamma = mV_a^2/(r_e+h)$ to determine the aerodynamic lift force (L). Indeed, in one or more embodiments, the variable W in equation above represents the aircraft weight, m represents aircraft mass, and $r_e$ represents the local radius of the Earth. Furthermore, in one or more embodiments, the trajectory control system 102 also utilizes the bank angle ($\phi$), the inertial flight plan angle ($\gamma$), true airspeed ($V_a$), and altitude (h) from previous calculations (e.g., at the current incremental time period).

Upon calculating the aerodynamic lift force (L), the trajectory control system 102 can calculate the coefficient of lift ($c_L$). For instance, the trajectory control system 102 can utilize the equation $c_L = L/(\bar{q}S)$ to calculate the coefficient of lift ($c_L$). In one or more embodiments, the variable $\bar{q}$ represents dynamic pressure and the variable S represents the reference wing area (e.g., the reference wing area of the UAV 100). Indeed, the trajectory control system 102 can calculate the dynamic pressure ($\bar{q}$) by utilizing the equation $\bar{q} = \rho V_a^2/2$.

Figure 4B:
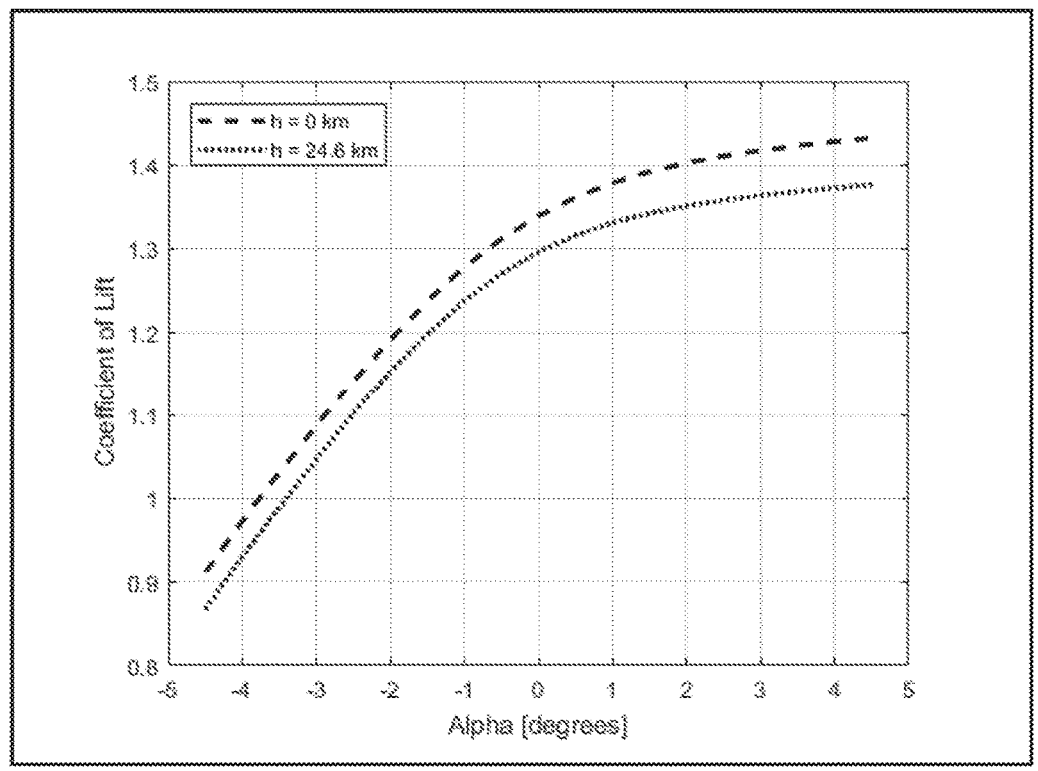
FIG. 4B illustrates a lift curve utilized by a trajectory control system in accordance with one or more embodiments.

Furthermore, upon identifying the coefficient of lift ($c_L$) the trajectory control system 102 can utilize a lift curve, represented as $c_L(\alpha, h)$, to determine the angle of attack ($\alpha$). For example, the trajectory control system 102 can perform a reverse lookup in the lift curve (e.g., as shown in FIG. 4B) to determine the angle of attack ($\alpha$) based on determined the coefficient of lift ($c_L$) and the known altitude (h).

Figure 4C:
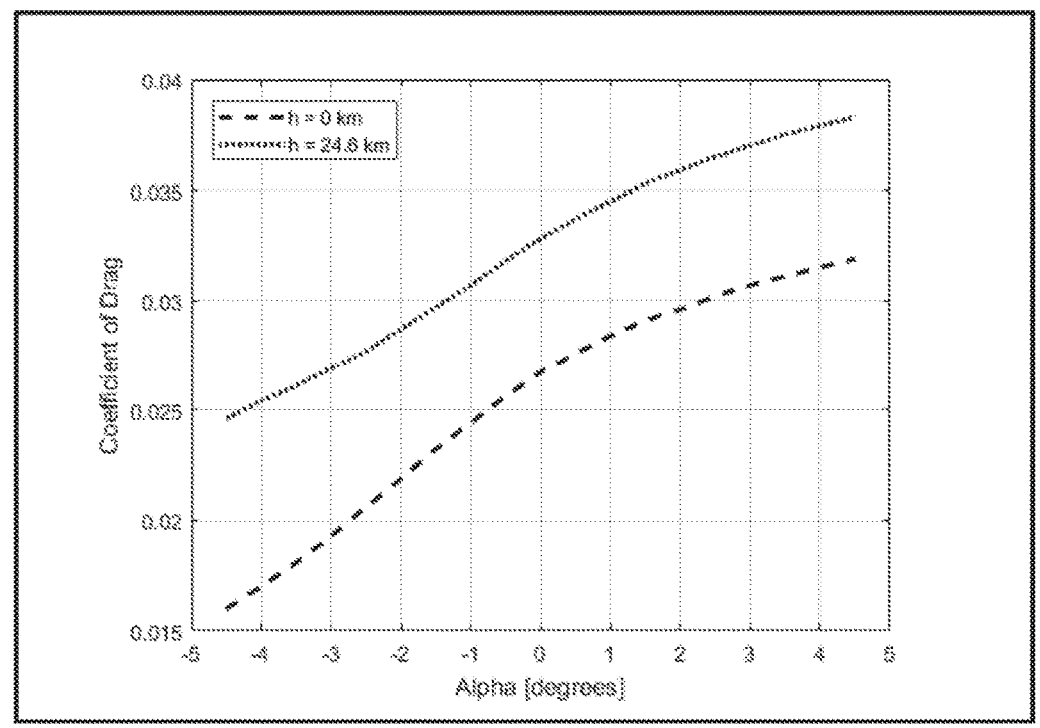
FIG. 4C illustrates a drag curve utilized by a trajectory control system in accordance with one or more embodiments.

Additionally, upon identifying the angle of attack ($\alpha$), the trajectory control system 102 can also determine (or identify) a coefficient of drag ($c_D$). For example, in one or more embodiments, the trajectory control system 102 utilizes a drag curve, represented as $c_D(\alpha, h)$, to determine the coefficient of drag ($c_D$). In particular, the trajectory control system 102 can perform a forward lookup in the drag curve (e.g., as shown in FIG. 4C) to determine the coefficient of drag ($c_D$) based on determined the angle of attack ($\alpha$) and the known altitude (h). Upon identifying the coefficient of drag ($c_D$), the trajectory control system 102 can determine a drag force for the UAV 100. Indeed, the trajectory control system 102 can utilize the equation $c_D = D/(\bar{q}S)$ to calculate the drag force (D) for the UAV 100.

As mentioned above, the trajectory control system 102 can utilize the aerodynamic lift force (L) of the UAV 100, the coefficient of lift ($c_L$), the estimated angle of attack ($\alpha$), the estimated coefficient of drag ($c_D$) to calculate thrust (T). In particular, the trajectory control system 102 can utilize the aerodynamic lift force (L) and the drag force (D) determined utilizing the coefficient of lift ($c_L$), the estimated angle of attack ($\alpha$), and the estimated coefficient of drag ($c_D$) to calculate the thrust (T) of the UAV 100. For instance, the trajectory control system 102 can calculate thrust (T) from the sum of the parallel forces about the center of gravity for the UAV 100 in translational flight with center line thrust (T) by utilizing the equation: $T-D-W \sin \gamma = m(V_a^i - V_a^{i-1})/\Delta T$. Furthermore, the trajectory control system 102 can also calculate the pitch angle ($\theta$) of the UAV 100 by utilizing the angle of attack ($\alpha$). In particular, the trajectory control system 102 can calculate the pitch angle ($\theta$) of the UAV 100 by utilizing the equation $\theta = \alpha + \gamma$.

Additionally, the trajectory control system 102 can calculate (or determine) the solar irradiance and total solar panel area projected perpendicularly at the sun for a solar model of the UAV 100. Indeed, the solar model can include irradiance, solar vector, and solar collection. In one or more embodiments, the irradiance is the average power per unit area received from the sun on a specific day, altitude, and solar elevation angle. For instance, the trajectory control system 102 can calculate the irradiance by utilizing the equation:

$$I = I_0 \left(1 + 0.034 \cos \frac{2\pi n_d}{365}\right) f(h, \varepsilon_S).$$

Indeed, in one or more embodiments, the variable $n_d$ represents the Julian day index, $I_0$ represents a solar constant, h represents the altitude, $\varepsilon_s$ represents the solar elevation angle, and $f(h, \varepsilon_s)$ represents an atmospheric absorption factor.

Furthermore, the trajectory control system 102 can calculate the total solar panel area projected perpendicularly at the sun for the UAV 100. In particular, in one or more embodiments, the trajectory control system 102 calculates the total solar panel area projected perpendicularly at the sun (represented as $A_p$) by utilizing the equation:

$$A_p = \Sigma_k A_{s,k} \begin{Bmatrix} -\cos\zeta_S \cos\varepsilon_S \\ -\sin\zeta_S \cos\varepsilon_S \\ \sin\varepsilon_S \end{Bmatrix}^T R_b^s \begin{bmatrix} x_k \\ y_k \\ z_k \end{bmatrix},$$

$$R_b^s = R_\psi R_\theta R_\phi,$$

$$R_\psi = \begin{bmatrix} \cos\psi & -\sin\psi & 0 \\ \sin\psi & \cos\psi & 0 \\ 0 & 0 & 1 \end{bmatrix},$$

$$R_\theta = \begin{bmatrix} \cos\theta & 0 & \sin\theta \\ 0 & 1 & 0 \\ -\sin\theta & 0 & \cos\theta \end{bmatrix},$$

$$R_\phi = \begin{bmatrix} 1 & 0 & 0 \\ 0 & \cos\phi & -\sin\phi \\ 0 & \sin\phi & \cos\phi \end{bmatrix}.$$

For instance, in one or more embodiments, referring to the equation above, the trajectory control system 102 includes k number of solar panels, each of which have an area $A_{s,k}$ and a position $[x_k, y_k, z_k]$. Indeed, the position $[x_k, y_k, z_k]$ can be based on the forward-right wing-down coordinate system of the UAV 100.

Upon determining the irradiance and the total solar panel area projected perpendicularly at the sun ($A_p$), the trajectory control system 102 can calculate a net power ($P_{net}$) utilized by the UAV 100. In one or more embodiments, the trajectory control system 102 represents power (P) as a rate of energy. For instance, the trajectory control system 102 can calculate the net power utilized by the UAV 100 by calculating $P_{net} = P_{in} - P_{out}$.

Referencing the equation above for $P_{net}$, the variable $P_{in}$ can represent input power. For example, in some embodiments, the rate of input power (e.g., solar energy) for the UAV 100 is calculated by $P_{in} = \eta_s I A_p$. In particular, in one or more embodiments, the variable $\eta_s$ represents solar panel efficiency, I represents the irradiance (as described above), and $A_p$ represents the total solar panel area projected perpendicularly at the sun (as described above). Indeed, in one or more embodiments, $P_{in}$ represents the rate of energy generated by the solar panels of the UAV 100. In some embodiments, the trajectory control system 102 utilizes solar energy as the only source of harnessed energy by the UAV 100. However, in one or more embodiments, the trajectory control system 102 can utilize other sources of energy to generate energy for the UAV 100.

Furthermore, the trajectory control system 102 can calculate the power output of the UAV 100. In particular, the trajectory control system 102 can calculate the power utilized by the UAV 100 when the UAV 100 utilizes the motors and other components of the UAV 100. For instance, the trajectory control system 102 can calculate the power output ($P_{out}$) of the UAV 100 by utilizing the equation $$P_{out} = P_{acc} + \frac{1}{2} T V_a \left[ \left(\frac{T}{N A_{dq}} + 1\right)^{\frac{1}{2}} + 1 \right].$$

Indeed, in one or more embodiments, the variable $P_{acc}$ represents accessory power (e.g., power output by components of the UAV 100 such as, but not limited to, the avionics system of the UAV 100). Moreover, the equation $$\frac{1}{2} T V_a \left[ \left(\frac{T}{N A_{dq}} + 1\right)^{\frac{1}{2}} + 1 \right]$$

represents the efficiency-adjusted propulsive power required to deliver the aerodynamic thrust (T). Additionally, referring to the equation above, the variable N represents the number of rotors on the UAV 100 and $A_d$ represents the propeller disk area (e.g., the propeller disk area for a rotor on the UAV 100).

Upon calculating the net power utilized by the UAV 100, the trajectory control system 102 can also calculate the energy stored in the UAV 100 (e.g., stored in the batteries of the UAV 100). For instance, in some embodiments, electrical energy is stored in and drawn from the batteries of the UAV 100. Indeed, the charging and discharging of the batteries of the UAV 100 can occur at different efficiencies. The trajectory control system 102 can calculate the energy stored ($E_b^i$) in all batteries of the UAV 100 after travelling for an incremental time period (e.g., traveling based on the provided command inputs for the incremental time period) by utilizing the equation $$E_b^i = E_b^{i-1} + \eta_b P_{net}^i \Delta T, \eta_b = \begin{cases} \eta_{in} & \text{if } P_{net}^i \geq 0 \\ \eta_{out} & \text{if } P_{net}^i < 0 \end{cases}.$$

In particular, in one or more embodiments, the variable $E_b^i$ represents the energy stored in the UAV 100 after traveling the incremental time period (i) and $E_b^{i-1}$ represents the energy stored in the UAV 100 in the preceding incremental time period (i–1). Furthermore, as described in the equation above, the $P_{net}^i$ can represent the net energy calculated for the current incremental time period (i). Additionally, in some embodiments, $\eta_b$ represents either the charging efficiency ($\eta_{in}$) or the discharging efficiency ($\eta_{out}$) depending on the value of $P_{net}^i$ (e.g., whether the mode of the battery is in charge or discharge).

In addition to stored battery energy ($E_b^i$), the trajectory control system 102 can also determine and utilize gravitational potential energy ($E_p^i$) of the UAV 100 to generate an optimized flight plan for the UAV 100. In one or more embodiments, the trajectory control system 102 accounts for gravitational energy only when the UAV 100 is above the altitude floor as represented in the equation $E_p^i = (h^i - h_{lo})mg$. Indeed, in one or more embodiments, the variable $h_{lo}$ represents the altitude floor, m represents the mass of the UAV 100, and g represents the acceleration due to gravity. Both the stored battery energy ($E_b^i$) and the gravitational potential energy ($E_p^i$) will be described in greater detail in the below figures.

In one or more embodiments, the trajectory control system 102 can also include other factors, environmental conditions, and/or UAV conditions within the calculations described above (e.g., the state of the UAV 100 after traveling during the incremental time period based on the command inputs). For instance, in one or more embodiments, the trajectory control system 102 can account for wind in the calculations described above. In particular, the trajectory control system 102 can track course of the UAV 100 instead of the heading, can calculate (or determine) the heading of the UAV 100 utilizing (or from) a wind triangle, and by utilizing an air-mass-referenced flight path angle. Indeed, the trajectory control system 102 can generate a flight plan that accounts for wind with insignificant impact to computation time and/or efficiency.

Moreover, in some embodiments, the trajectory control system 102 utilizes the calculations above to identify a possible state of the UAV 100 after travelling during (or within) the incremental time period i. For instance, the trajectory control system 102 can utilize the calculated North offset ($p_n^i$), East offset ($p_e^i$), the updated altitude ($h^i$), the updated heading angle ($\psi^i$), the stored battery energy ($E_b^i$), and the true air speed ($V_a^i$) for an state ($S^i$). Indeed, as mentioned above, the initial state ($S^i$) (e.g., the state during the first incremental time period) can be obtained from a previously calculated flight plan, identifying the initial state from utilizing the conditions of the UAV 100 as the preceding state (e.g., $S^{i-1}$, $h^{i-1}$, $\psi^{i-1}$, $E_b^{i-1}$, etc.), and/or from utilizing the conditions of the UAV 100 as the initial state. Additionally, the trajectory control system 102 can utilize a date and time of the flight as parameters for an initial state of the UAV 100.

As mentioned above, the trajectory control system 102 utilizes one or more possible command inputs to identify a plurality of possible states of the UAV 100 at an incremental time period. For instance, the trajectory control system 102 utilizes the command inputs (e.g., $\Delta h^{i+1}$ and $\Delta \psi^{i+1}$) for a subsequent incremental time period (i+1) to identify a possible state of the UAV 100 at the subsequent incremental time period (e.g., referred to as state $S^{i+1}$). Indeed, the identified subsequent possible state ($S^{i+1}$) can include a calculated North offset ($p_n^{i+1}$), East offset ($p_e^{i+1}$), updated altitude ($h^{i+1}$), updated heading angle ($\psi^{i+1}$), stored battery energy ($E_b^{i+1}$), and true air speed ($V_a^{i+1}$). As mentioned above, the trajectory control system 102 utilizes one or more possible command inputs to identify a plurality of possible states of the UAV 100 at an incremental time period. In particular, the trajectory control system 102 can utilize varying values for command inputs ($\Delta h^{i+1}$ and $\Delta \psi^{i+1}$) to determine the plurality of possible states of the UAV 100 at incremental time period i+1.

Furthermore, in one or more embodiments, the trajectory control system 102 limits the possible command inputs utilized to identify the plurality of possible states. For example, in one or more embodiments, the trajectory control system 102 utilizes an upper limit of, the lower of, 3 degrees γ or 0.8 m/s for command input values for change of altitude rates ($\Delta h^i$). In some embodiments, the limits of $\Delta h^i$ apply to all $\Delta h$ (regardless of the incremental time period). Furthermore, the upper limit (or lower limit) can vary depending on information such as, but not limited to, the altitude of the UAV 100 and/or the stored battery energy of the UAV 100. Additionally, the trajectory control system 102 can utilize a lower limit of $\Delta h^i$ that is symmetric (e.g., symmetric to the upper limit). In some embodiments, the trajectory control system 102 further restricts the lower limit of $\Delta h^i$ to be higher than a value which results in a negative thrust value.

Moreover, the trajectory control system 102 can utilize a limit for command input values for change in bank angle rates ($\Delta \psi$). For instance, in one or more embodiments, the trajectory control system 102 limits command input values for $\Delta \psi$ based altitude. In particular, the trajectory control system 102 can utilize a bank angle limit for $\Delta \psi$ ranging from 5 degrees at sea level to 10 degrees at a higher altitude (e.g., 23 km and higher altitudes). In one or more embodiments, the trajectory control system 102 can provide (or utilize) limits for other command inputs and/or information utilized to identify a state of the UAV 100. For instance, the trajectory control system 102 can specify that battery charging is disabled when the battery storage is full and/or battery discharging is disabled when the battery storage is empty (e.g., based on an indication of the maximum energy storage capacity).

As mentioned above and as shown in FIG. 4A, the trajectory control system 102 can perform an act 402 to identify a plurality of possible states of the UAV 100 after travelling for a first incremental time period (e.g., from $S^i$ to $S^{i+1}$). Indeed, referring to FIG. 4A, the trajectory control system 102 can identify the plurality of possible states (the plurality of $S^{i+1}$) by utilizing a plurality of different command inputs (e.g., varying values for $\Delta h^n$ and $\Delta \psi^{i+1}$). In some embodiments, the trajectory control system 102 can associate each state ($S^{i+1}$), from the plurality of states at incremental time period i+1, with a corresponding energy change value that is determined using and/or (described in greater detail in the figures below). In one or more embodiments, the energy change value, whether positive or negative, represents the amount of energy that is utilized for the UAV 100 to transition from the initial state ($S^i$) to the subsequent possible state ($S^{i+1}$) for each of the plurality of identified possible states ($S^{i+1}$).

Furthermore, in one or more embodiments, the trajectory control system 102 modifies the energy change value associated with the possible states based on the position of the UAV 100 at subsequent possible state ($S^{i+1}$). For instance, the trajectory control system 102 can modify the energy change value by weighting the energy change value based on whether the UAV 100 is positioned outside a boundary zone (e.g., a three-dimensional boundary) at the subsequent possible state ($S^{i+1}$). The trajectory control system 102 weighting the energy change value based on a boundary zone is described in greater below.

Moreover, the trajectory control system 102 can identify (or calculate or determine) subsequent possible states for the UAV 100 for each subsequent incremental time period to determine an optimized flight plan for the UAV 100 by utilizing an efficient greedy algorithm. For example, as shown in FIG. 4A, the trajectory control system 102 can perform an act 404 of selecting a predetermined number of possible states for the first incremental time period based on a calculated energy change of each possible state from the first incremental time period. In particular, the trajectory control system 102 can select the predetermined number of possible states based on the calculated energy change that is associated with each state ($S^{i+1}$). For example, the trajectory control system 102 can select a predetermined number (e.g., top 2) of possible states (e.g., from $S^{i+1}$) that correspond to the least loss of energy and/or highest gain in energy for the UAV 100 to transition from state $S^i$ to $S^{i+1}$. In some embodiments, the trajectory control system 102 can select the predetermined number of possible states corresponding to the possible states that result in the highest energy storage (e.g., based on $E_b^{i+1}$ and/or $E_p^{i+1}$).

Furthermore, in one or more embodiments, the trajectory control system 102 only calculates subsequent possible states for the next incremental time period from the selected predetermined number of possible states (e.g., from act 404). In some embodiments, the trajectory control system 102 disregards the non-selected possible states by performing actions such as, but not limited to, discarding the non-selected possible states and/or tagging the non-selected possible states to discontinue further calculation from those possible states. Furthermore, in one or more embodiments, the trajectory control system 102 performs actions such as, but not limited to, storing the selected predetermined number of possible states and/or tagging the selected possible states to continue identifying subsequent possible states from those selected states. In one or more embodiments, the trajectory control system 102 utilizes a tree structure to represent each possible state of the UAV 100 as a node and each energy change value as an edge between two nodes (as described in FIGS. 4 and 5). Furthermore, the trajectory control system 102 can continue identifying possible states of the UAV 100 from the nodes that represent the selected predetermined number of states at each incremental time period. Although a tree structure is described in one or more figures, the trajectory control system 102 can utilize non-tree structure approaches to generate an optimized flight plan by utilizing a greedy algorithm in accordance with one or more embodiments described herein.

For instance, as shown in FIG. 4A, the trajectory control system can perform an act 406 of identifying a plurality of possible states of the UAV 100 after traveling each subsequent incremental time period within the flight time window. In particular, after selecting the predetermined number of possible states based on energy change in the first incremental time period (i+1), the trajectory control system 102 can identify a plurality of possible states (e.g., $S^{i+2}$) for a subsequent incremental time period (e.g., i+2) from the selected predetermined number of possible states from the first (or preceding) incremental time period (e.g., i+1). For example, in one or more embodiments, the trajectory control system 102 calculates (or identifies) the plurality of possible states (e.g., $S^{i+2}$) for a subsequent incremental time period (e.g., i+2) by performing the calculations described above using one or more possible command inputs (e.g., varying values for $\Delta h^{i+2}$ and $\Delta \psi^{i+2}$) and information from the preceding state of the UAV (e.g., $S^{i+1}$). Furthermore, the trajectory control system 102 can continuously select a predetermined number of possible states based on an associated energy change value and identify a plurality of possible states for the UAV 100 at each subsequent incremental time period (e.g., i+2, i+3, . . . , i+n) until the flight time window is complete (e.g., the sum of all of the incremental time periods is equal to the total time within the flight time window).

Upon identifying a plurality of possible states for the UAV 100 at each subsequent incremental time period in accordance with one or more embodiments, the trajectory control system 102 can generate (or determine) a flight plan for the UAV 100 that maximizes stored energy on the UAV 100 after traveling for the flight time window duration. For example, as shown in FIG. 4A, the trajectory control system 102 can perform an act 408 selecting a flight plan for the flight time window of the UAV 100. In particular, the trajectory control system 102 can analyze the plurality of possible states from the final (or last) incremental time period to select (or identify) a final state that corresponds to the highest stored energy for the UAV 100.

Furthermore, the trajectory control system 102 can identify (based on an indicator that links the plurality of states in memory and/or a path from connecting nodes in a tree structure) the command inputs and corresponding possible states at each incremental time period from the selected final state to the initial state of the UAV 100. Indeed, the trajectory control system 102 can utilize the identified command inputs and corresponding possible states between the selected final state and the initial state of the UAV 100 to generate a flight plan. The trajectory control system 102 identifying a plurality of possible states of the UAV after travelling each subsequent incremental time period and generating a flight plan within a tree structure, by utilizing a greedy algorithm, is described in further detail in FIGS. 5A-5C.

Figure 5A:
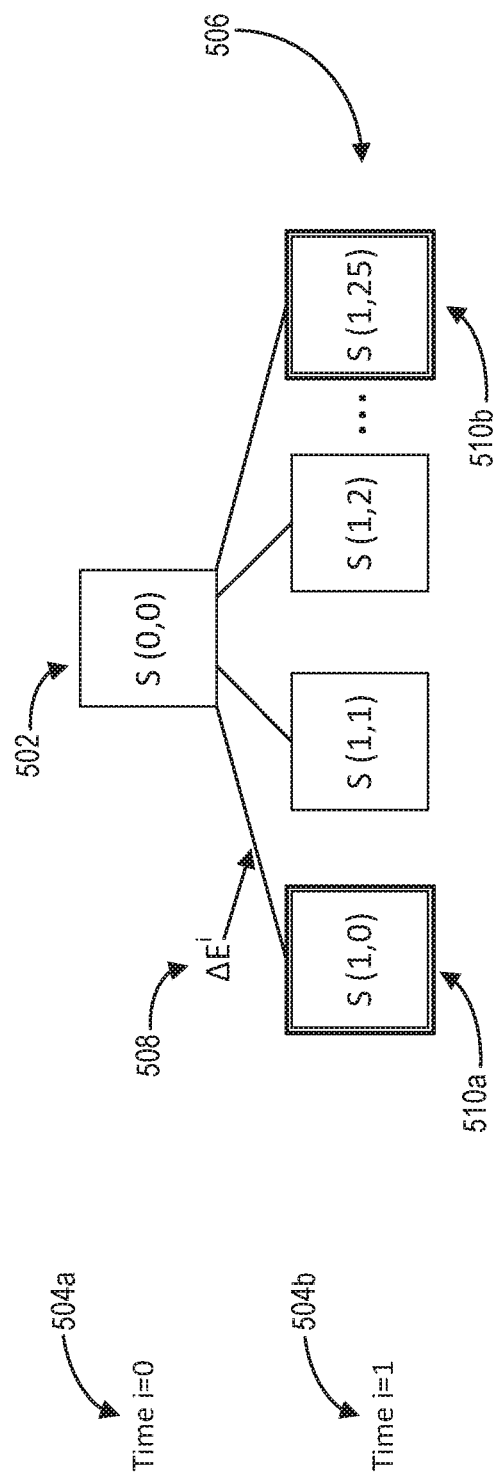
FIGS. 5A-5C illustrate utilizing a tree structure to generate a flight plan for a UAV in accordance with one or more embodiments.
Figure 5B:
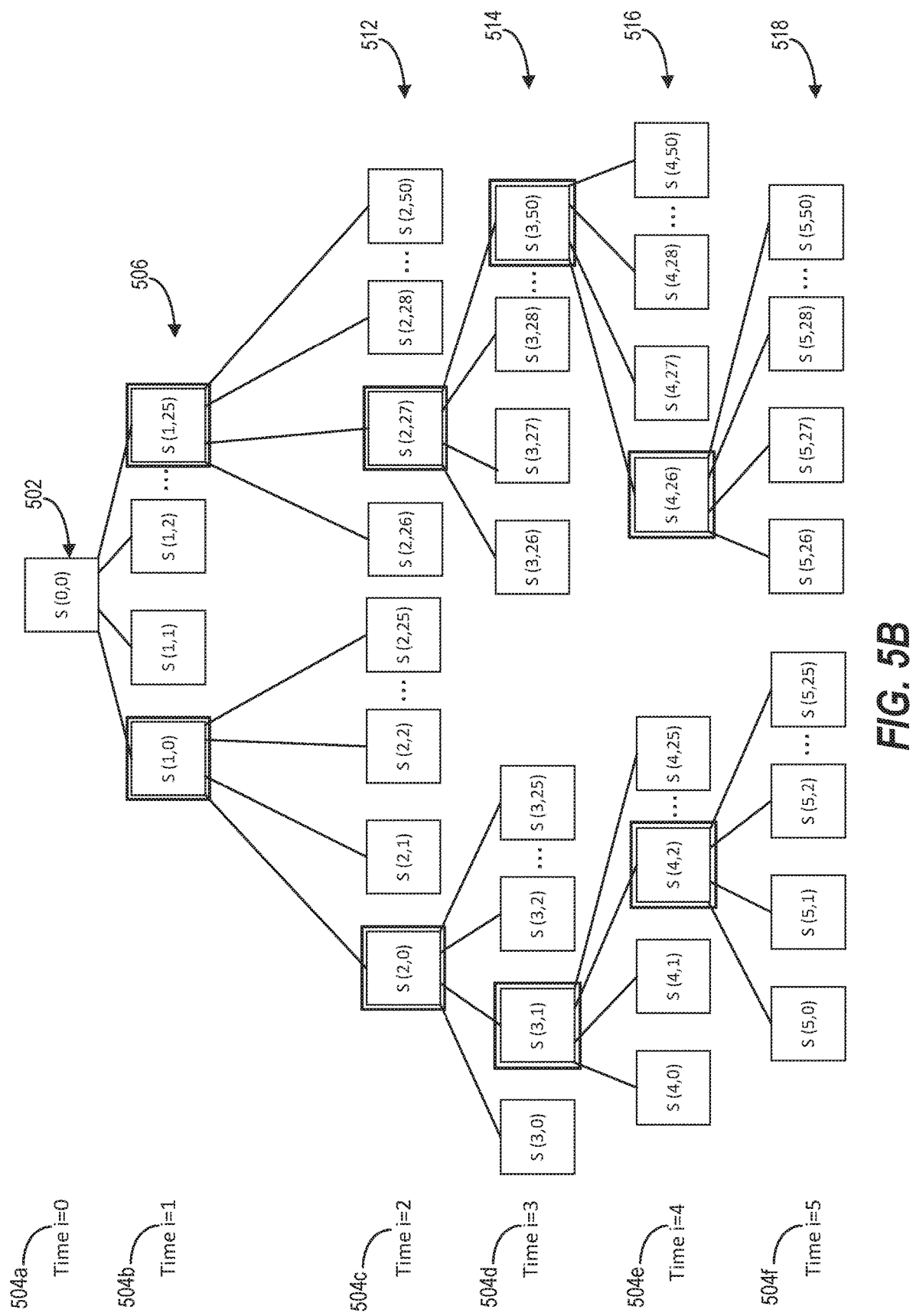
Figure 5C:
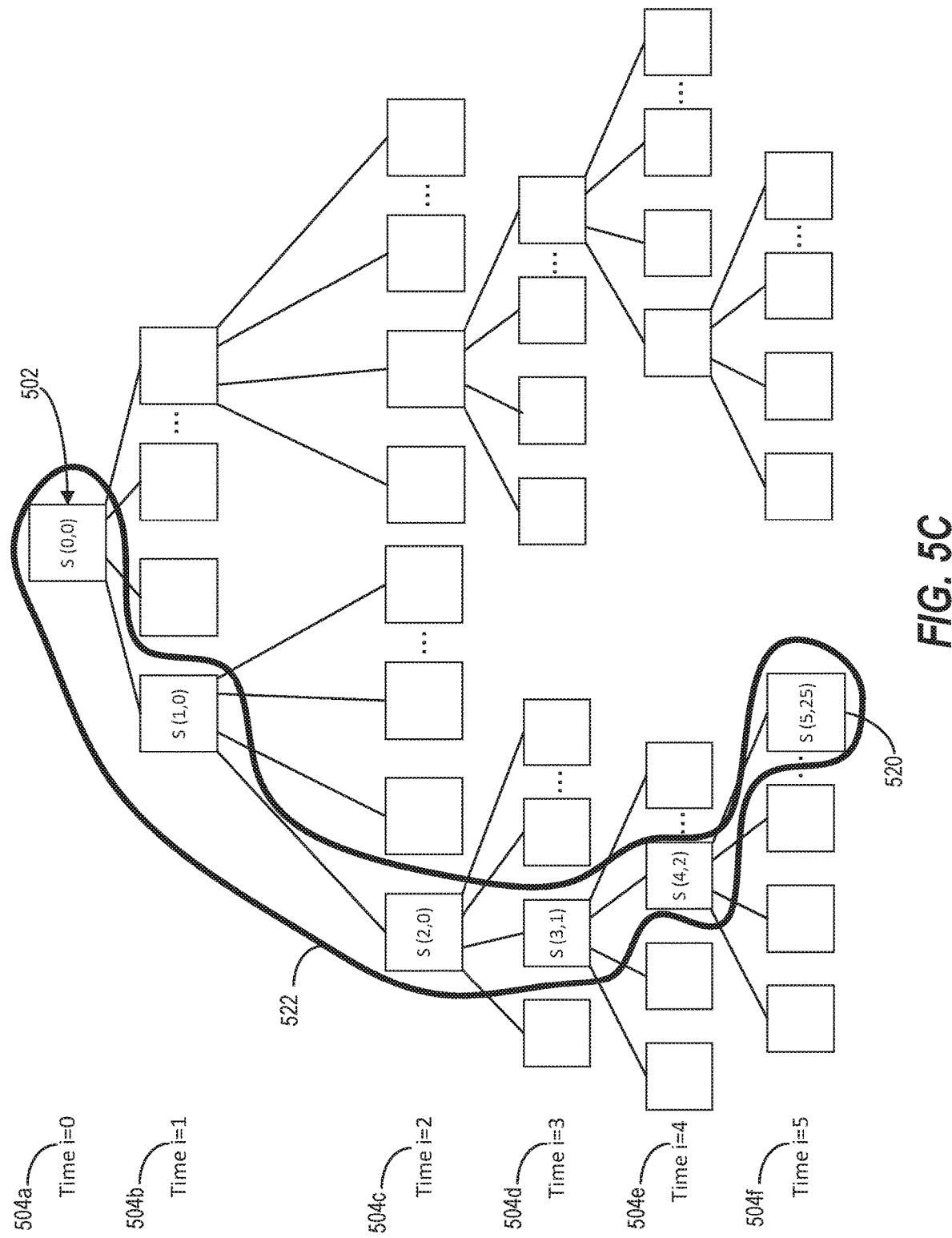

As mentioned above, the trajectory control system 102 can generate a flight plan for the UAV 100 by utilizing a greedy algorithm and a tree structure that represents the plurality of possible states of the UAV 100. In particular, the trajectory control system 102 can generate a flight plan for the UAV 100 by utilizing a greedy algorithm to identify an optimal path from edges that connect nodes representing possible states of the UAV 100 at various incremental time periods. For example, FIGS. 5A-5C illustrate the trajectory control system 102 utilizing a greedy algorithm to identify a path (associated with energy change) within a tree structure that represents a plurality of identified possible states to generate a flight plan for the UAV 100. In particular, in some embodiments, the trajectory control system 102 utilizes a greedy algorithm based on a multi-path variation of Dijkstra's shortest path algorithm to generate determine a flight plan for the UAV 100.

As shown in FIG. 5A and as mentioned above, the trajectory control system 102 can identify a plurality of possible states of the UAV 100 from an initial state of the UAV 100. For example, in one or more embodiments, the trajectory control system 102 utilizes a plurality of possible command inputs to calculate the state of the UAV 100 after transitioning from an initial state of root node 502 (represented as the root node S(0,0)) at a start of the flight time window 504a (represented as incremental time period, i=0) to a plurality of possible states represented as nodes 506 (represented as node S(1, n)) at the first incremental time period 504b (represented as incremental time period, i=1). As described above, the trajectory control system 102 can utilize a plurality of possible command inputs to calculate each possible state at the first incremental time period 504b (e.g., S(1,0), S(1,1), S(1,2), . . . , S(1, 25)).

Furthermore, the trajectory control system 102 can calculate an edge weight that represents an energy change value (such as weighted edge 508) between each node at different incremental time periods. For example, in one or more embodiments, the trajectory control system 102 can calculate an energy change value that corresponds to transitioning between two states of the UAV 100 when the UAV 100 executes a set of possible command inputs. For example, as shown in FIG. 5A, the energy change value (or change in adjusted energy) can be represented as $\Delta E^i$ at an edge between two nodes (such as weighted edge 508). In particular, in some embodiments, the trajectory control system 102 utilizes information from an identified possible state at an incremental time period and information from the previous state of the UAV 100 at the preceding incremental time period (e.g., transition between two nodes) to calculate $\Delta E^i$.

For example, in one or more embodiments, the trajectory control system 102 can calculate the change in adjusted energy ($\Delta E^i$) as $\Delta E^i = E^i - E^{i+1}$. Indeed, in some embodiments, the trajectory control system 102 defines the adjusted energy $E^i$ as the sum of stored battery energy and a weighted gravitational energy that is penalized by positional violations of the containment region (e.g., the three-dimensional boundary). For example, in one or more embodiments, the trajectory control system 102 represents the adjusted energy $E^i$ as $E^i = E_b^i + kE_p^i)/q^i$. In particular, $E_b^i$ can represent stored battery energy and $E_p^i$ can represent gravitational potential energy as calculated above in accordance with one or more embodiments. Furthermore, the variable k can represent a potential energy weight. In one or more embodiments, the trajectory control system 102 sets the potential energy weight (k) to zero to optimize the adjusted energy based on the battery only (e.g., $E_b^i$). Indeed, in one or more embodiments, the trajectory control system 102 sets the potential energy weight (k) to zero at night time (e.g., when the solar elevation angle ($\varepsilon_s$) is less than zero).

Figure 6:
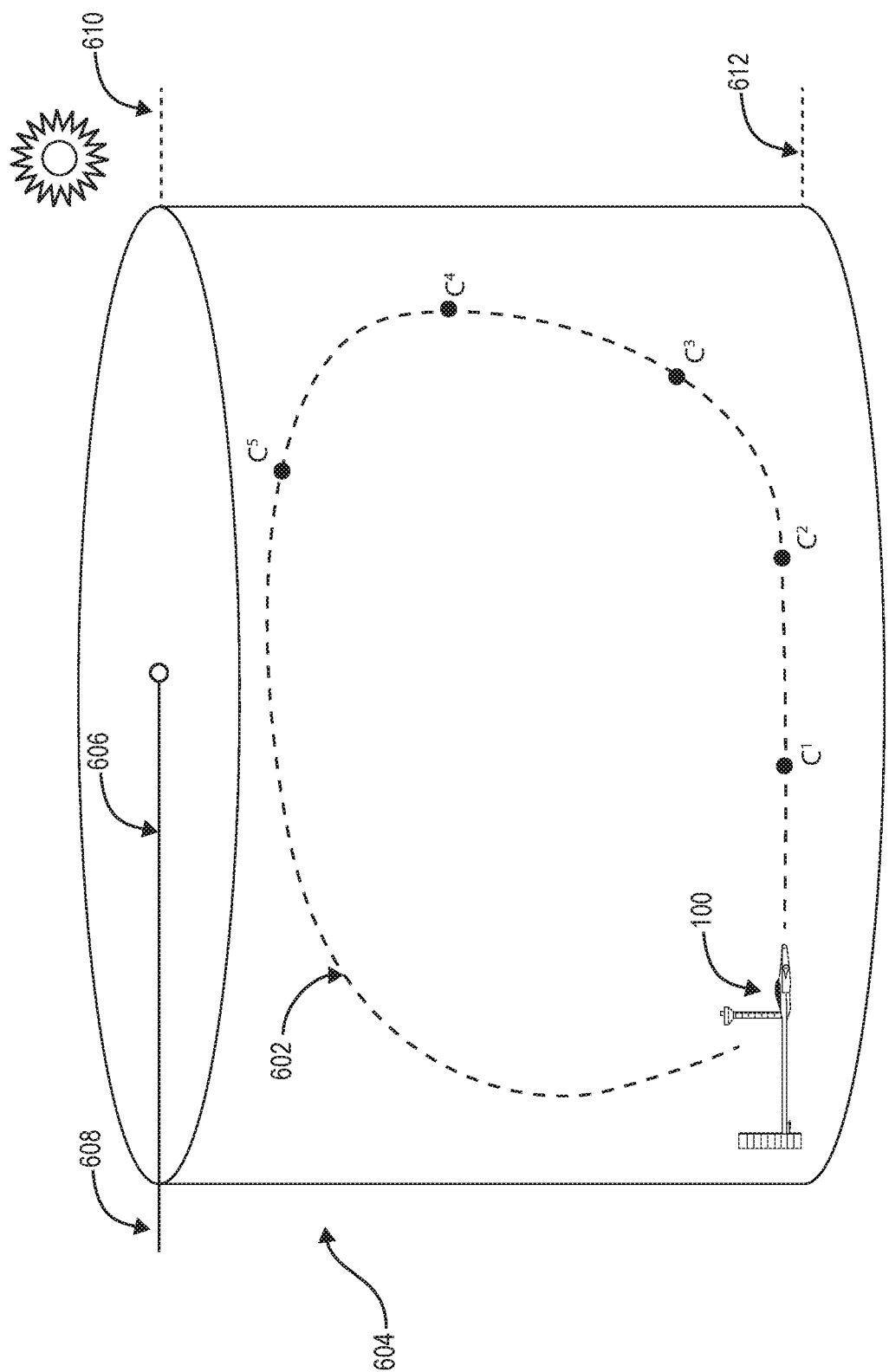
FIG. 6 illustrates an example flight plan for a UAV within a containment region in accordance with one or more embodiments.

Furthermore, $q^i$ can represent a penalty for when the UAV 100 is (or is calculated to be) outside of the containment region (described in further detail in FIG. 6). For example, the trajectory control system 102 can penalize an adjusted energy at a possible state and/or a change in energy value associated with the possible state when the UAV 100 is positioned outside of a containment region that is represented by vertical and horizontal boundaries. For example, in one or more embodiments, the trajectory control system 102 determines the penalty $q^i$ by utilizing the equations:

$$q^i = \begin{cases} 1 & q_v^i = q_h^i = 0 \\ q_0 + q_v^i + q_h^i & \text{otherwise,} \end{cases}$$

$$q_v^i = \begin{cases} |h^i - h_{lo}|/(h_{hi} - h_{lo}) & h^i < h_{lo} \\ |h^i - h_{hi}|/(h_{hi} - h_{lo}) & h^i > h_{hi} \\ 0 & \text{otherwise,} \end{cases}$$

-continued $$q_h^i = \begin{cases} |d^i - r_c + r_b|/r_c & d^i > (r_c - r_b) \\ 0 & \text{otherwise.} \end{cases}$$

In one or more embodiments, the variable $q_v^i$ represents a vertical penalty and the variable $q_h^i$, represents a horizontal penalty. Furthermore, in some embodiments, the variable $q_0$ represents a constant infeasibility factor that enables faster adaptation. In one or more embodiments, the trajectory control system 102 can select a value for $q_0$. Furthermore, in one or more embodiments, the variables $h_{lo}$ and $h_{hi}$ represent an altitude floor and an altitude ceiling of the containment region respectively. Furthermore, the variable $r_c$ can represent the radius of the containment region (e.g., of the containment volume) and the variable $r_b$ can represent the buffer radius of the containment region. Moreover, in some embodiments, the variable $d^i$ represents the horizontal distance from the position of the UAV 100 (e.g., based on the North and East offset) to the center of the containment area and can be determined utilizing the equation $d^2 = p_e^2 + p_n^2$. In one or more embodiments, the North and East offsets represent the distance from the center of a containment region. Additionally, in one or more embodiments, the trajectory control system 102 can penalize the change in adjusted energy (e.g., the weighted edge of a node such as the weighted edge 508) when the UAV 100 is determined to be positioned vertically outside of the altitude floor or ceiling or horizontally outside of the radius of the containment area. In addition, the trajectory control system 102 can similarly calculate an adjusted energy at a state of the UAV 100 in a preceding incremental time period (e.g., $E^{i-1}$).

Indeed, referring to FIG. 5A, each node is designated with a S(i, n), where i represents the incremental time period and n denotes each possible state at the incremental time period (i) based on one set of the possible command inputs from the plurality of command inputs. For example, in one or more embodiments, the trajectory control system 102 can calculate, at the first incremental time period, a first possible state, S(1,0), from a first set of command inputs, a second possible state, S(1,1), from a second set of command inputs, a third possible state, S(1,2), from a third set of command inputs, and so forth in accordance with one or more embodiments herein. Indeed, in one or more embodiments, the trajectory control system 102 can store in memory each node (e.g., represented as S(i, n)) and each edge weight (e.g., representing an adjusted energy change $\Delta E^i$) that corresponds to each node.

Although FIGS. 5A-5C illustrate, as an example, the trajectory control system 102 identifying 26 possible states of the UAV 100 at each incremental time period, the trajectory control system 102 can calculate any number of possible states based on any number of possible command inputs at each incremental time period. Indeed, in one or more embodiments, the trajectory control system 102 can configure the number of possible states that are calculated at each incremental time period. Moreover, increasing (or decreasing) the number of possible states that are calculated at each incremental time period results in an increase (or decrease) in the number of nodes at each incremental time period of the tree structure represented in FIGS. 5A-5B.

After calculating an edge weight (e.g., such as weighted edge 508) between the initial state (e.g., the root node 502) as an adjusted change in energy ($\Delta E^i$) to transition from the initial state, S(0,0), to the plurality of possible states, represented as nodes 506, during the first incremental time period 504b, the trajectory control system 102 can utilize a greedy algorithm to reduce the exponential number of nodes that result from identifying a plurality of possible states at each incremental time period. For instance, in one or more embodiments, the trajectory control system 102 utilizes the edge weights that represent an adjusted change in energy ($\Delta E^i$) (such as weighted edge 508) to select a predetermined number of possible states represented in nodes 510a and 510b from the plurality of possible states, represented as nodes 506, in the first incremental time period 504b. In particular, the trajectory control system 102 can select the predetermined number of possible states represented in nodes 510a and 510b based on the edges connecting the nodes corresponding to the selected possible states represented as nodes 510a and 510b having the largest weight (e.g., $\Delta E^i$) amongst all of the edges at the first incremental time period 504b. In one or more embodiments, the largest weight is a result of having the highest gain in adjusted energy or the lowest loss in adjusted energy (e.g., the highest positive value for $\Delta E^i$ or the least negative value for $\Delta E^i$) amongst all of the edges at the first incremental time period 504b.

Furthermore, although FIG. 5A illustrates, as an example, the trajectory control system 102 selecting two nodes as the predetermined number of possible states, the trajectory control system 102 can be configured select other numbers of nodes as the predetermined number of possible states. Indeed, in one or more embodiments, the trajectory control system 102 can be configured to select a k number of nodes as the predetermined number of possible states (e.g., k can be, but is not limited to, 2, 5, 10, etc.). Moreover, in one or more embodiments, the trajectory control system 102 stores the k number of nodes from the first incremental time period 504b with the largest edge weights as predetermined number of possible states to memory (e.g., known as buffering).

Upon selecting the top k number of nodes (e.g., k=2) from the edges between the root node 502 (e.g., the initial state) and the nodes 506 (e.g., the plurality of possible states) at the first incremental time period 504b with the largest edge weights, the trajectory control system 102 can utilize a plurality of possible command inputs to identify a plurality of possible states at each subsequent incremental time period in accordance with the one or more embodiments above. Furthermore, the trajectory control system 102 can select a predetermined number of possible states at each subsequent incremental time period and identify a plurality of possible states for the UAV 100 from the selected predetermined number of possible states in accordance with the one or more embodiments above.

For example, FIG. 5B illustrates the trajectory control system 102 identifying the plurality of possible states for the UAV 100 at each subsequent incremental time period within a flight time window by utilizing the greedy algorithm with buffering. For instance, as shown in FIG. 5B, after selecting the predetermined number (e.g., k=2) of possible states at the first incremental time period 504b (e.g., i=1), the trajectory control system 102 can identify a plurality of possible states as nodes 512 after the UAV 100 travels according to a plurality of possible command inputs from the first incremental time period (504b) (e.g., i=1) to the second incremental time period 504c (e.g., i=2). As shown in FIG. 5B, the trajectory control system 102 can represent the plurality of possible states as nodes 512 at second incremental time period 504c (e.g., i=2) as leaf nodes that branch from the root node 502 (e.g., the initial state) and the nodes 506 (e.g., the identified possible states at a first incremental time period 504b). Furthermore, as shown in FIG. 5B, the trajectory control system 102 can represent the nodes 512 from the second incremental time period 504c as states, S(2,0) through S(2,50). As mentioned above, although twenty-five possible states are calculated per preceding possible state in FIGS. 5A-5C, the trajectory control system 102 can calculate any number of possible states of the UAV 100 after travelling during an incremental time period from a preceding state of the UAV 100.

In addition to identifying the plurality of possible states of the UAV 100 (e.g., nodes 506) after travelling the second incremental time period 504c, the trajectory control system 102 can also calculate an adjusted energy change associated with transitioning to each of the plurality of possible states represented as nodes 512 from the selected predetermined possible states of the UAV 100 from the nodes 506 (e.g., the nodes 510a and 510b from FIG. 5A). In particular, in one or more embodiments, the trajectory control system 102 can calculate the adjusted energy change as weighted edges between the nodes 506 (e.g., the selected nodes 510a and 510b from FIG. 5A) to the nodes 512. Indeed, the trajectory control system 102 can calculate the weighted edges as the adjusted energy change (e.g., $\Delta E^i$) in accordance with the one or more embodiments above.

Furthermore, as shown in FIG. 5B, the trajectory control system 102 can utilize the calculated weighted edges between the nodes 506 (e.g., representing the possible states of the UAV 100 at the first incremental time period 504b) and nodes 512 (e.g., representing the possible states of the UAV 100 at the second incremental time period 504c) to select a predetermined number of possible states at the second incremental time period 504c. In particular, the trajectory control system 102 can select the nodes representing states S(2,0) and S(2,27) as the predetermined number of possible states at the second incremental time period 504c when the selected nodes (e.g., nodes corresponding to S(2,0) and S(2,27)) are associated with the two largest weighted edges (e.g., the calculated $\Delta E^i$ in accordance with one or more embodiments) between nodes 506 and nodes 512. As shown in FIG. 5B, the trajectory control system 102 can select the predetermined number of possible states at an incremental time period from all of the identified possible states within an incremental time period. Indeed, referring to FIG. 5B, in one or more embodiments, the trajectory control system 102 utilizes the identified plurality of possible state at the last incremental time period (e.g., i=5), represented as nodes 518 (e.g., the leaf nodes of the tree structure), as possible final states of the UAV 100 after travelling for the duration of the flight time window.

Additionally, as shown in FIG. 5B, the trajectory control system 102 can identify a plurality of possible states and select a predetermined number of possible states based on the adjusted energy change value associated with the plurality of possible states for any number of incremental time periods within a flight time window. For example, as shown in FIG. 5B, the trajectory control system 102 can continue to identify a plurality of possible states (e.g., represented as nodes 514, 516, and 518) from a selected predetermined number of possible states at each incremental time period (e.g., incremental time periods 504d-504f) as described above. Indeed, as shown in FIG. 5B, in order to select the predetermined number of possible states, the trajectory control system 102 can calculate the adjusted energy change ($\Delta E^i$) (e.g., as weighted edges) between the nodes of each incremental time period and select the predetermined number of possible states at each incremental time period based on the calculated adjusted energy change in accordance with the one or more embodiments above.

Although FIG. 5B illustrates the trajectory control system 102 identifying a plurality of possible states for incremental time periods 504a-504f, the trajectory control system 102 can identify a plurality of possible states for any number of incremental time periods. For example, in one or more embodiments, the trajectory control system 102 can identify a plurality of possible states and select a predetermined number of possible states based on an adjusted energy change associated with the possible states for each incremental time period within a flight time window.

For instance, the trajectory control system 102 can generate a flight plan for a flight time window of 24-hours by identifying a plurality of possible states and selecting a predetermined number of possible states based on an adjusted energy change associated with the possible states for each incremental time period within the flight time window of 24-hours. Indeed, referring to FIG. 5B, when the trajectory control system 102 utilizes incremental time periods of ten seconds each, the trajectory control system 102 can generate a tree structure that includes nodes for identified possible states for eight-thousand six hundred forty incremental time periods (e.g., 24-hours divided into ten second increments).

After identifying a plurality of possible states and selecting a predetermined number of possible states based on the adjusted energy change value associated with the plurality of possible states for each incremental time period, the trajectory control system 102 can select a final state from the plurality of possible states to generate a flight plan for the UAV 100. For example, FIG. 5C illustrates the trajectory control system 102 selecting a final state based on adjusted energy of the UAV 100 associated with the plurality of possible states from the final incremental time period and selecting nodes (from each incremental time period of the tree structure) to create a path from the selected final state and the initial state to generate the flight plan for the UAV 100. Indeed, in some embodiments, the trajectory control system 102 can utilize the command inputs associated with the selected nodes (e.g., representing a possible state of the UAV 100) to generate the flight plan for the UAV 100. In some embodiments, the trajectory control system 102 can terminate identifying the plurality of possible states (e.g., nodes) before the final incremental time period when a leaf node results prior to completion of all of the incremental time periods within the flight time window.

For instance, in one or more embodiments, the trajectory control system 102 selects a final state from the last incremental time period to generate a flight plan for the UAV 100. In particular, in some embodiments, the trajectory control system 102 selects a final state from the identified plurality of possible state from the last incremental time period. In one or more embodiments, the trajectory control system 102 identifies, from the plurality of possible states, a state that corresponds to the largest adjusted energy value for the UAV 100 (e.g., $E^t$). Additionally, the trajectory control system 102 can utilize the selected state corresponding to the largest adjusted energy value as the final state of the flight time window. Furthermore, in some embodiments, the trajectory control system 102 can select the final state of the UAV 100 based on the stored battery energy ($E_b^t$) of the UAV 100 corresponding to each of the identified possible states of the UAV 100 at the last incremental time period.

For example, FIG. 5C illustrates the trajectory control system 102 selecting a final state (represented as node 520) from the identified plurality of possible states to generate a flight plan for the UAV 100. Indeed, as shown in FIG. 5C, the trajectory control system 102 can determine that node 520 corresponds to the identified possible state (e.g., state S(5, 25)) that is associated with the largest adjusted energy value ($E^t$). Furthermore, as illustrated in FIG. 5C, the trajectory control system 102 can select node 520 (e.g., representing identified state S(5, 25)) as the final state for a flight plan for the UAV 100.

Upon identifying a final state from a plurality of identified possible states, the trajectory control system 102 can identify a set of states representing a path from the selected final state to the initial state of the UAV 100 to generate a flight plan. For instance, in one or more embodiments, the trajectory control system 102 identifies, starting from the selected final state, the preceding identified possible state that resulted in the final state of the UAV 100 at the preceding incremental time period (from the incremental time period corresponding to the final state). Furthermore, the trajectory control system 102 can continue to identify a preceding identified possible state for each preceding incremental time period until the initial state is reached. Indeed, in one or more embodiments, the trajectory control system 102 generates a dataset which includes the identified states, from each incremental time period, that represent a path from the final state to the initial state.

Furthermore, the trajectory control system 102 can identify a set of states representing a path from the selected final state to the initial state of the UAV 100 from a tree structure. For example, the trajectory control system 102 can, starting from a selected leaf node that represents the selected final state of the UAV 100, identify edges and nodes at each incremental time period that connect the final state to the initial state of the UAV 100. Moreover, the trajectory control system 102 can generate a dataset which includes each node at each incremental time period that creates a path (via the edges of the tree structure) from the node corresponding to the selected final state to root node corresponding to the initial state of the UAV 100. In one or more embodiments, the trajectory control system 102 can tag each node that connects (via an edge) the leaf node corresponding to the selected final state with the root node corresponding to the initial state of the UAV 100.

For example, as illustrated in FIG. 5C, the trajectory control system 102 can, starting from the selected node 520 corresponding to the selected final state (S(5,25), identify a set of nodes (each corresponding to a state) that represents a path 522 from the node 520 corresponding the selected final state to the root node 502 corresponding to the initial state of the UAV 100. Additionally, as illustrated in FIG. 5C, the trajectory control system 102 can identify a set of nodes (each corresponding to a state) that represents the path 522 by selecting a node from each incremental time period (e.g., from each of incremental time period 504f through 504a). Indeed, as shown in FIG. 5C, the trajectory control system 102 can identify a set of nodes that correspond to the states S(5,25), S(4,2), S(3,1), S(2,0), S(1,0), and S(0,0).

Furthermore, after identifying a set of states representing the path from the selected final state to the initial state (or the initial state to the selected final state), the trajectory control system 102 can identify a set of command inputs corresponding to each state from the set of states representing the path. Indeed, as described in one or more embodiments herein, the command inputs represent the instructions provided to the UAV 100 to transition from a state to another state during an incremental time period. In one or more embodiments, the trajectory control system 102 can store, in memory, the set of command inputs that resulted in each of the possible states of the UAV 100 at each incremental time period. Moreover, the trajectory control system 102 can identify, for the set of states representing the path, each command input that causes the UAV 100 to transition from the initial state to each subsequent state in the identified path and, lastly, to the final state of the UAV 100 during the flight time window. In particular, in some embodiments, the trajectory control system 102 backtracks the set of command inputs that were utilized to achieve the selected final state.

For instance, as described in FIGS. 5A and 5B, the trajectory control system 102 utilizes a set of possible command inputs at each incremental time period to transition from the initial state to the plurality of possible states of each incremental time period. Referring to FIG. 5C, in addition to identifying the path 522, the trajectory control system 102 can identify the set of command inputs corresponding to each node in the path 522 (e.g., the command inputs that causes the UAV 100 to transition to the possible states corresponding to the nodes). For instance, the trajectory control system 102 can identify the command inputs (e.g., $C^i$) utilized at start of the flight time window (i=0) to transition from the initial state of root node 502 to the identified possible state in the first incremental time period 504b (i=1) within path 522. Furthermore, the trajectory control system 102 can identify the command inputs utilized at each incremental time period 504a-504f (e.g., $C^1$, $C^2$, $C^3$, $C^4$, and $C^5$) that results in the UAV 100 transitioning from the initial state of root node 502 to the subsequent selected states at each incremental time period represented in path 522, and, lastly, to the selected final state of node 520.

Additionally, upon identifying a path that represents a set of states from the initial state to a selected final state that maximizes the energy storage of the UAV 100 after travelling during a flight time window, the trajectory control system 102 can utilize the set of states and, an identified, corresponding set of command inputs to generate the optimal flight plan for the UAV 100. Indeed, in one or more embodiments, the trajectory control system 102 can provide the flight plan, which includes the set of command inputs, corresponding time periods for the commands, and/or the set of states, to a flight control system of the UAV 100. Furthermore, the flight control system of the UAV 100 can utilize the command inputs at each incremental time period (e.g., the future times corresponding to each command input) to cause the UAV 100 to operate within the determined trajectory of the flight plan.

For example, FIG. 6 illustrates the UAV 100 utilizing a flight plan, which includes a set of command inputs, provided by the trajectory control system 102 to operate within the determined trajectory of the flight plan. Indeed, as shown in FIG. 6, the UAV 100 utilizes a set of command inputs (e.g., $C^1$, $C^2$, $C^3$, $C^4$, and $C^5$ as identified in FIGS. 5A-5B) to cause the UAV 100 to operate within the determined trajectory 602 of the generated flight plan described in FIGS. 5A-5C. Although, FIG. 6 illustrates the UAV 100 operating utilizing the command inputs identified in FIGS. 5A-5C, the UAV 100 can receive various flight plans, which include any number of command inputs, as generated in accordance with one or more embodiments herein.

Furthermore, as described above, the trajectory control system 102 can penalize states, adjusted energy changes, and/or weighted edges corresponding to states that position the UAV 100 outside of a containment region. For example, FIG. 6 illustrates a containment region 604 for the UAV 100. Indeed, as shown in FIG. 6, the containment region 604 can include a radius 606 of the containment region (e.g., variable $r_c$ as described above). In addition, as shown in FIG. 6, the containment region 604 can include a buffer radius 608 (e.g., variable $r_b$ as described above). Moreover, as shown in FIG. 6, the containment region 604 can include an altitude ceiling 610 (e.g., variable $h_{hi}$ as described above) and an altitude floor 612 (e.g., variable $h_{lo}$ as described above). Indeed, in one or more embodiments, the trajectory control system 102 can penalize a state, an energy change value, and/or a weighted edge corresponding to an energy change value when a possible state of the UAV 100 positions the UAV 100 outside of the radius 606, the buffer radius 608, the altitude ceiling 610, and/or the altitude floor 612. In some embodiments, the containment region can include a radius of three-kilometers from the center of the containment region. Additionally, although FIG. 6 illustrates the containment region as a cylindrical volume, the trajectory control system 102 can utilize other three-dimensional boundary shapes and corresponding boundary limits such as an altitude floor and ceiling to represent the containment region. Furthermore, the trajectory control system 102 can utilize a containment region that is represented by an altitude floor and ceiling, but no horizontal boundary.

As mentioned above, by utilizing a greedy algorithm in accordance with one or more embodiments herein, the trajectory control system can calculate an optimized flight plan with less execution time relative to conventional systems (i.e., with faster speed). For example, in some embodiments, the trajectory control system calculates an optimized flight plan by identifying the plurality of possible states for the UAV 100 at each subsequent incremental time period within a flight time window by utilizing the greedy algorithm with buffering in accordance with one or more embodiments herein to increase efficiency and computing speed to enable trajectory planning for the UAV 100 in real-time and/or in-flight.

In particular, some conventional systems cannot generate flight plans for high-altitude, long-endurance aircrafts in-flight because performing the calculations to generate the flight plan require large amounts of processing resources and/or execution time. For example, one such conventional system utilizes the gradient-based method. In particular, the gradient-based method evaluates the objective function: minimize $E_b+kE_p+\Phi[g(x(t), u(t))]$. For instance, the gradient-method starts with an initial guess for a vector u (representing inputs for the conventional system) and integrates the differential equation (i.e., the objective function) for a given input and disturbance to identify a state (x(t)). Then the gradient-based method perturbs the vector u one element at a time to estimate the gradient. Furthermore, the estimated gradient is used to make an incremental update to the vector u. Additionally, the gradient-based method then iterates the process until either a convergence criteria is met or the maximum number of iterations is reached.

Furthermore, some conventional utilize a model predictive control ("MPC") method. The MPC method works similarly to the gradient-based method mentioned above. However, in the MPC method, the difference equation (i.e., the objective function) is not explicitly integrated. Instead, the state (x(t)), the input (u(t)), and the disturbance (w(t)) are represented by set of functions: $x(t)=\Sigma_{j=0}^{m}\omega_j\xi_j(t)$, $u(t)=\Sigma_{j=0}^{m}\sigma_j\xi_j(t)$, and $x(t)=\Sigma_{j=0}^{m}\mu_j\xi_j(t)$. Additionally, in the MPC method, the differential equation is then transformed to a set of equality constraints consisting of the new optimization variables $\omega_j$ and $\sigma_j$ for j=1, . . . , m. Once the differential equation is replaced by a set of equality constraints (i.e., the above constraints), the MPC method can solve the optimization problem using a number of gradient methods.

As mentioned above, conventional systems such as ones that utilize a gradient-based method or an MPC method are oftentimes inefficient and incapable of real-time computation and/or computation in-flight. In some conventional systems, the gradient-based method operates with a complexity of O(nTN). Furthermore, in some conventional systems, the MPC method operates with a complexity of O(mN).

For example, Table 1, below, illustrates computational times for systems that utilize the gradient-based method and the MPC method in both a direct integration (e.g., the slow integration) and a novel discrete approximate integration (e.g., a fast integration) to generate an optimized trajectory (or flight plan) for a 30-minute flight time window (referred to as a "horizon"). Indeed, the results are calculated with the 30-minute flight time window discretized to ten-second increments (i.e., 180 increments within the 30-minutes) and with three variables per input vector $\mu^i$. As such, the number of optimization variables is n=3×180=540. Additionally, the time needed to integrate the differential equation is represented as T (i.e., for the single-CPU, T=2 s for the slow integration and T=0.1 s for the fast integration). Moreover, N represents the number of iterations (i.e., N=100 for the calculations represented in Table 1 below). Also, the number of optimization variables in the MPC method are represented as 2m (i.e., m=30 for the calculations represented in Table 1 below). In particular, Table 1, below, illustrates the computational complexity and single-CPU time of solving (or calculating) a 30-minute flight time window optimized flight plan using the conventional gradient-based and MPC methods.

TABLE 1

| Method | Complexity | Computation Time | |
|---|---|---|---|
| | | Slow Integration | Fast Integration |
| Gradient-based | O(nTN) | 30 hours | 1.5 hours |
| MPC | O(mN) | 60 minutes | 30 minutes |

Relative to some conventional systems (e.g., the conventional systems above that utilize gradient-based methods and/or MPC methods), the trajectory control system 102 can determine a flight plan more efficiently and/or with less execution time (i.e., with faster computation times). For instance, in one or more embodiments, the trajectory control system 102 utilizes a tree structure where each node represents a possible state of the UAV 100 and the depth of the tree structure represents time (e.g., each incremental time period). Furthermore, as described above, each edge of the tree structure is associated with a change in energy value. Indeed, as described above, in some embodiments, the trajectory control system 102 determines the flight plan by finding the longest path (e.g., the path in tree structure from root node to leaf node that results in the most stored energy for the UAV 100).

Utilizing a tree structure to determine the longest path from the root node to all of the leaf nodes to determine a path that results in the most stored energy for the UAV 100 can result in an exponential number of calculations. For instance, let $\overline{S}^i$ be the set of all possible states that the UAV 100 can transition to and $\overline{C}^i$ be the set of all possible command inputs that can be taken at an incremental time period (i). In particular, letting $c:=|\overline{C}^i|$, there are roughly $c^{i+1}$ possible states $s \in \overline{S}^{i+1}$ to identify. Indeed, when determining a flight plan (or trajectory) for an N number of incremental time periods, the total number of nodes and edges in the tree structure representation can to the order of $O(c^N)$.

However, the trajectory control system 102 overcomes this problem by utilizing a greedy algorithm (as described in the embodiments above). In particular, the trajectory control system 102 significantly reduces the complexity of determining a flight plan for the UAV 100 by utilizing a greedy algorithm that buffers a top k possible states (e.g., the predetermined number of possible states) at each incremental time period, starting from the root node (e.g., the initial state) as described in accordance with one or more embodiments above. For instance, by storing the top k nodes, the trajectory control system 102 computes the weights (e.g., the possible states and/or the energy change level) for k×c possible states (e.g., nodes). Furthermore, the trajectory control system 102 picks the subsequent top k nodes with the largest total weight from the preceding nodes and computes the weights for those k nodes (e.g., another k×c possible states). Indeed, the trajectory control system 102 can compute weights for and select the top k nodes for an N number of times (e.g., the number of incremental time periods as described above).

Consequently, in some embodiments, the trajectory control system 102 reduces the overall complexity of determining an optimized flight plan to O(Nkclog(kc)) by utilizing a greedy algorithm. For example, Table 2 below demonstrates the speed and efficiency of determining an optimized flight plan in accordance with one or more embodiments of the trajectory control system 102. In particular, Table 2 shows the computation time of the trajectory control system 102 when the trajectory control system 102 determines an optimized flight plan for an aircraft with a flight time window of 1, 2, 6, 12, and 24-hours with a buffer size of 5 or 10 (e.g., the predetermined number of possible states and/or k in the complexity equation above). Indeed, as mentioned above, in some embodiments, the trajectory control system 102 determines an optimized flight plan that maximizes the energy storage of an aircraft within approximately 92-seconds (or approximately 1.5 minutes).

TABLE 2

| Simulation length | Elapsed time (seconds) | |
|---|---|---|
| (hours) | buffer size (k) = 5 | buffer size (k) = 10 |
| 1 | 92 | 169 |
| 2 | 251 | 358 |
| 6 | 600 | 1400 |
| 12 | 973 | 2163 |
| 24 | 1513 | 3460 |

Figure 7:
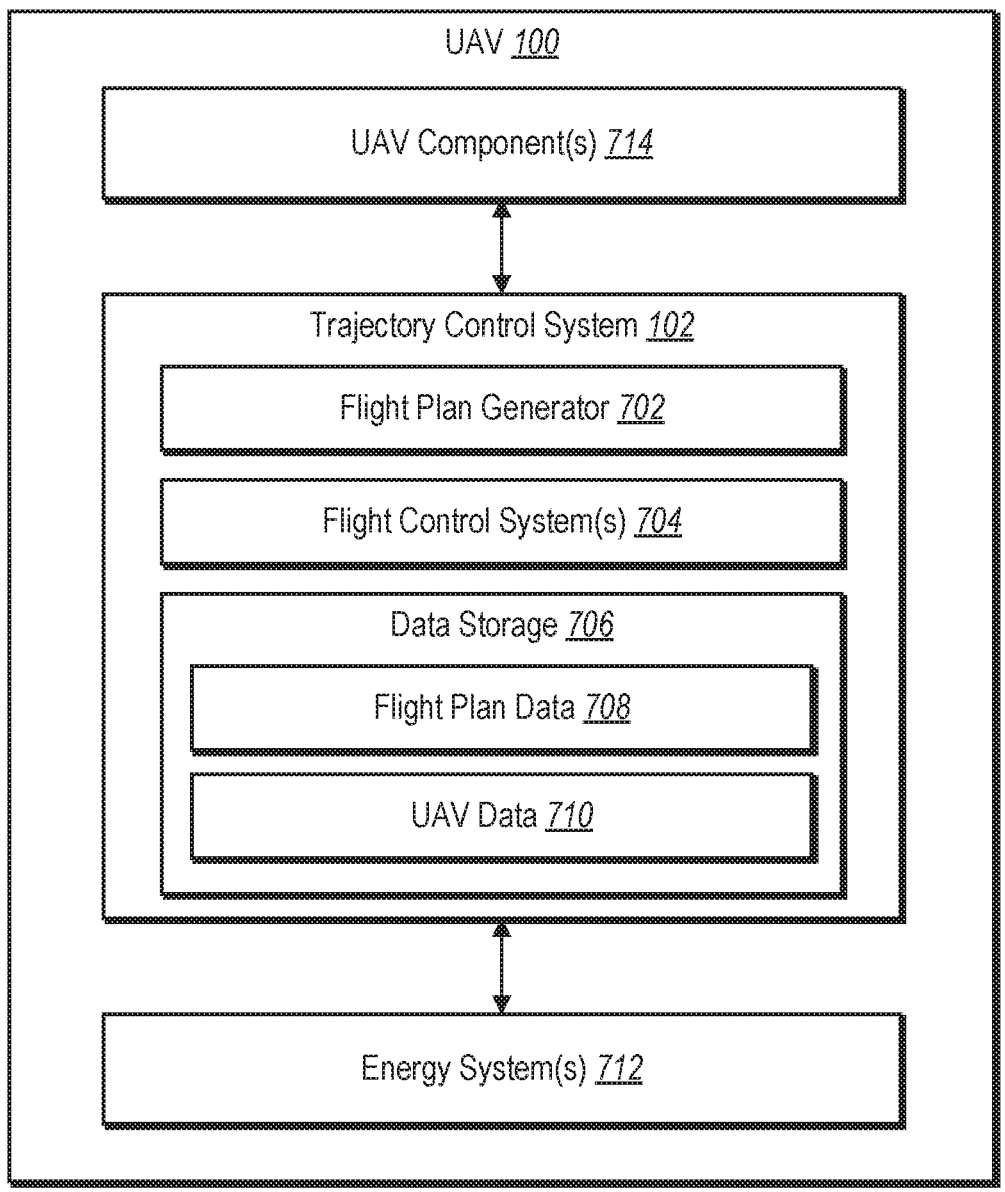
FIG. 7 illustrates a schematic diagram of a trajectory control system in accordance with one or more embodiments.

Turning now to FIG. 7, additional detail will be provided regarding components and capabilities of the trajectory control system 102. Specifically, FIG. 7 illustrates an example schematic diagram of the trajectory control system 102 implemented within the UAV 100. As shown in FIG. 7, the UAV 100 can include the trajectory control system 102, and/or UAV component(s) 712. Furthermore, as shown in FIG. 7, the trajectory control system 102 can include a flight plan generator 702, a flight control system 704, and/or data storage 706 (which can include flight plan data 708 and/or UAV data 710). While FIG. 7 depicts a particular number of components, in some embodiments, the trajectory control system 102 and/or the UAV 100 may include more or fewer components. In addition, the components may perform additional and/or alternative tasks than those described hereafter. Furthermore, the components (e.g., the components of the trajectory control system 102 and/or the components of the UAV 100) can be implemented and/or operated on a server device and/or other computing device of the UAV 100.

As mentioned above, the trajectory control system 102 includes a flight plan generator 702. In particular, the flight plan generator 702 can receive, identify, generate, calculate, determine, utilize, compute, communicate, and/or provide one or more informational elements (i.e., data) associated with one or more components of the UAV 100 and/or other factors relevant to flight of the UAV 100 (e.g., environmental factors, date and time, solar patterns, etc.). For instance, the flight plan generator 702 can receive, identify, generate, calculate, determine, utilize, and/or compute one or more informational elements to determine an optimized flight plan (or trajectory) for the UAV 100 in accordance with one or more embodiments described above. Furthermore, the flight plan generator 702 (and/or trajectory control system 102) can provide a determined flight plan to any of or any combination of other components of the UAV 100 (e.g., the UAV component(s) 712, the flight control system 704, and/or the data storage 706).

Additionally, as mentioned above, the trajectory control system 102 includes a flight control system 704. In particular, the flight control system 704 can receive, identify, calculate, determine, utilize, communicate, and/or provide a flight plan to control and/or instruct the course of the UAV 100. For instance, the flight control system 704 can receive and/or identify a flight plan from the flight plan generator 702 (and/or the trajectory control system 102). Furthermore, the flight control system 704 can utilize the flight plan and/or provide instructions (or command inputs) from the flight plan to any of or any combination of other components of the UAV 100 (e.g., the UAV component(s) 712, the flight plan generator 702, and/or the data storage 706) to cause the UAV 100 to operate in accordance with the flight plan.

As also mentioned above, the trajectory control system 102 includes data storage 706. In particular, the data storage 706 can store data such as flight plan data 708 and/or UAV data 710. Furthermore, any of or any combination of components of the UAV 100 (e.g., the trajectory control system 102, the flight plan generator 702, the flight control system 704, and/or the UAV component(s) 712) can access, utilize, identify, receive, provide, store, communicate with, write, and/or read to/from the data storage 706. In particular, the flight plan data 708 can include data such as, but not limited to, flight parameters, states of the UAV 100, possible states of the UAV 100, command inputs, tree structure data (e.g., nodes and edges stored as data and/or in memory), and/or flight plans (or trajectory plans) for the UAV 100. Furthermore, the UAV data 710 can include data such as, but not limited to, velocity, altitude, energy storage, solar panel conditions, time and day information, weather conditions, structural and/or system information, other flight parameters, other UAV related characteristics (e.g., dynamics and/or kinematics of a UAV), and/or other environmental characteristics.

As mentioned, the UAV 100 includes UAV component(s) 712. In particular, the UAV component(s) 712 receive, identify, determine, utilize, compute, communicate, and/or provide one or more informational elements (i.e., data) associated with one or more components of the UAV 100 and/or other factors relevant to flight of the UAV 100 (e.g., environmental factors, date and time, solar patterns, etc.). Furthermore, the UAV component(s) 712 can include components such as motors, propellers, energy systems (e.g., solar panels and/or batteries), sensors, mechanical components, electrical components, and/or network components of the UAV 100. Additionally, the UAV component(s) 712 can receive, identify, and/or utilize a flight plan from any of or any combination of other components of the UAV 100 (e.g., the trajectory control system 102, the flight plan generator 702, the flight control system 704, and/or the data storage 706). Moreover, the UAV component(s) 712 can utilize a flight plan (e.g., the command inputs corresponding to a flight plan) to cause the UAV 100 to travel in the course (or trajectory) associated with the flight plan.

One or more of the above-mentioned components of the trajectory control system 102 and/or UAV 100 can communicate with other components via an appropriate communications protocol. For example, the trajectory control system 102, flight plan generator 702, the flight control system 704, data storage 706, and/or the UAV component(s) 714 can communicate with any of or any combination of each component of the UAV 100 via wired and/or wireless means (and/or via a network).

FIGS. 1-7, the corresponding text, and the examples provide a number of different systems, methods, and/or devices for optimizing the trajectory of an unmanned aerial vehicle. In addition to the foregoing, embodiments can also be described in terms of flowcharts comprising a series of acts and/or steps in a method for accomplishing a particular result. For example, turning now to FIG. 8, this figure illustrates a flowchart of a series of acts 800 for optimizing the trajectory of an unmanned aerial vehicle. The acts of FIG. 8 can be performed as part of a method. Moreover, a non-transitory computer-readable medium can comprise instructions, that when executed by one or more processors, cause a computing device to perform the acts of FIG. 8. In still further embodiments, a system can perform the acts of FIG. 8.

Figure 8:
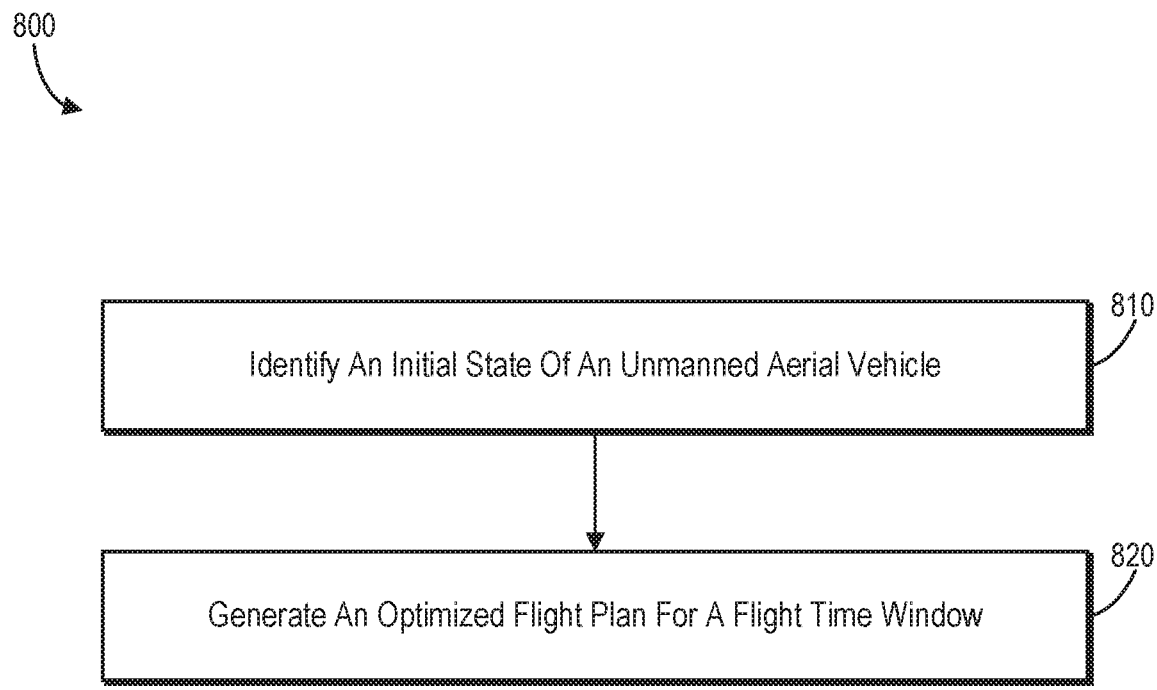
FIG. 8 illustrates a flow chart of a series of act for optimizing a trajectory of a UAV in accordance with one or more embodiments.

As illustrated in FIG. 8, the series of acts 800 may include an act 810 of identifying an initial state of an unmanned aerial vehicle. In particular, the act 810 can include identifying an initial state of an unmanned aerial vehicle where the initial state can include an indication of an initial energy of the unmanned aerial vehicle and an initial position of the unmanned aerial vehicle. The initial state can further include an indication of one or more initial directional offsets, an initial altitude, an initial date, an initial time, and an initial maximum energy storage capacity of the unmanned aerial vehicle. Furthermore, the initial state can include an indication of an east directional offset, a north directional offset, an altitude, a date, a time, and a maximum energy storage capacity of the unmanned aerial vehicle. Additionally, the initial state can include a heading angle and a true velocity of the unmanned aerial vehicle. Moreover, any state of the unmanned aerial vehicle can include an indication of energy, position, an east directional offset, a north directional offset, an altitude, a date, a time, a heading angle, a true airspeed, and/or a maximum energy storage capacity of the unmanned aerial vehicle. The initial state of the unmanned aerial vehicle can be identified from a previous flight plan.

As illustrated in FIG. 8, the series of acts 800 may still further include an act 820 of generating an optimized flight plan for a flight time window. In particular, the act 820 can include generating an optimized flight plan for a flight time window, by, for a first incremental time period of the flight time window, identifying a plurality of possible states of the unmanned aerial vehicle after traveling during the first incremental time period from the initial state and calculating, for each of the plurality of possible states of the unmanned aerial vehicle at the first incremental time period, an energy change associated with transitioning to the possible state, and selecting a predetermined number of possible states for the first incremental time period based on the calculated energy change of each of the plurality of possible states of the unmanned aerial vehicle at the first incremental time period. Furthermore, the act 820 can include generating the optimized flight plan for the flight time window, by, for each subsequent incremental time period of the flight time window, identifying a plurality of possible states of the unmanned aerial vehicle after traveling during the subsequent incremental time period from the selected predetermined number of possible states for a preceding incremental time period, calculating an energy change for each of the plurality of possible states of the unmanned aerial vehicle after traveling during the subsequent incremental time period, and selecting a predetermined number of possible states for the subsequent incremental time period based on the calculated energy change of each of the plurality of possible states of the unmanned aerial vehicle after the subsequent incremental time period. Additionally, the act 820 can include generating the optimized flight plan for the flight time window, by analyzing the plurality of possible states for a final incremental time period of the flight time window to select a final state based on a final energy associated with the final state and determining a flight plan for the flight time window for the unmanned aerial vehicle from the initial state to the selected final state.

Furthermore, the act 820 can include determining the flight plan by identifying a set of states representing a path from the initial state to the selected final state, where the set of states include a state for each incremental time period of the flight time window, and identifying a set of command inputs to transition through the set of states to the final state. In addition, the set of command inputs can include a change in heading angle of the unmanned aerial vehicle and a change in altitude of the unmanned aerial vehicle for a corresponding state from the set of states. The act 820 can also include analyzing the plurality of possible states for the final incremental time period of the flight time window to select the final state based on the final energy associated with the final state by selecting a state from the plurality of possible states from the final incremental time period corresponding to a highest stored energy of the unmanned aerial vehicle at the final incremental time period. Additionally, the calculated energy change can be based on an amount of energy generated by one or more solar panels of the unmanned aerial vehicle within a corresponding incremental time period and an amount of energy utilized by the unmanned aerial vehicle within the corresponding incremental time period. Also, the act 820 can include identifying a predetermined containment region and, for each of the plurality of possible states for each incremental time period, applying a penalty to the possible state if the possible state has a position outside of the containment region. Furthermore, the containment region can be represented by a three-dimensional boundary.

Furthermore, the act 820 can include generating the optimized flight plan for the flight time window during active flight of the unmanned aerial vehicle. Moreover, the predetermined number (for selecting possible states of the unmanned aerial vehicle) can be between 5 and 10. In addition, the flight time window can be between 15 minutes and 24 hours. Also, the incremental time period can be between 5 and 15 seconds.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
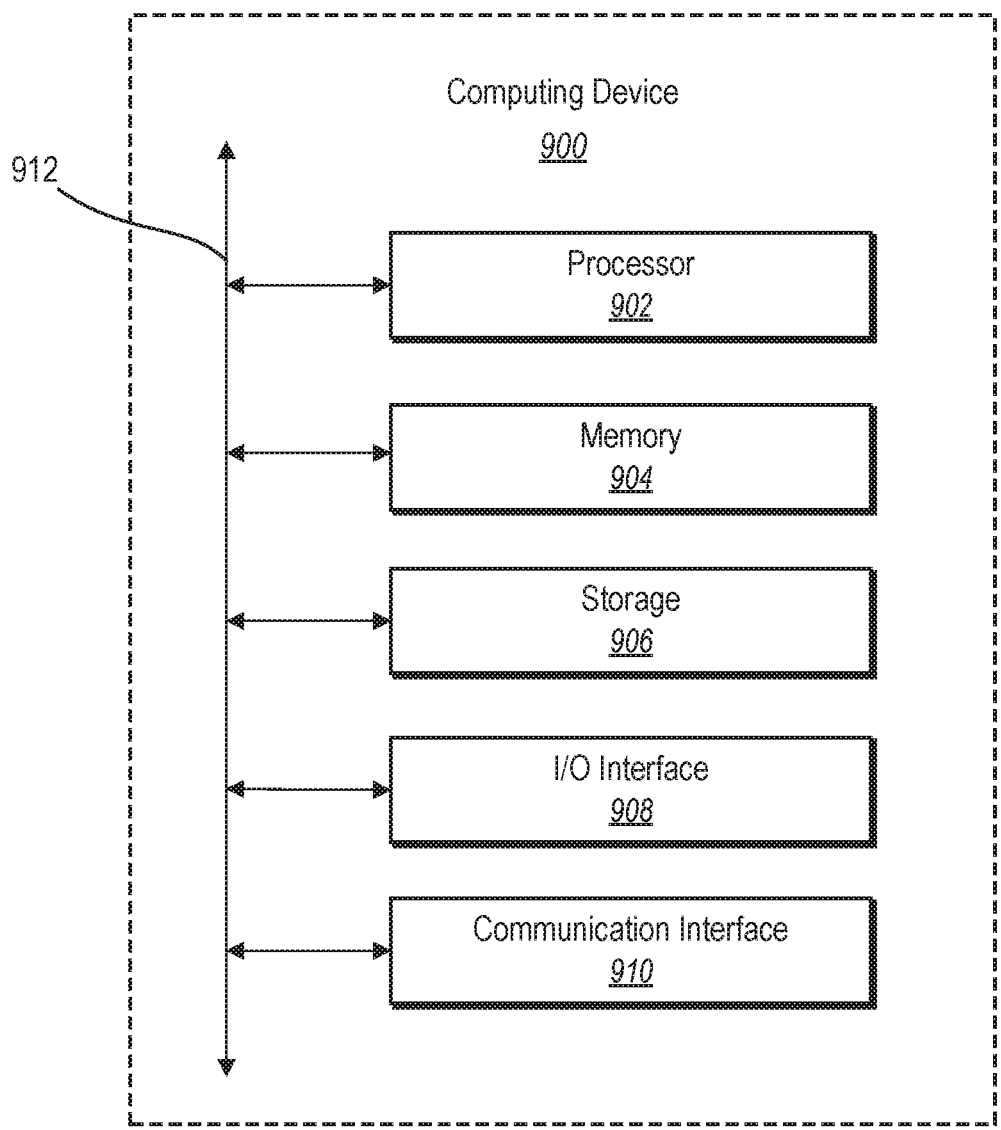
FIG. 9 illustrates a block diagram of an example computing device in accordance with one or more embodiments.

FIG. 9 illustrates, in block diagram form, an exemplary computing device 900 that may be configured to perform one or more of the processes described above. In one or more embodiments, the UAV 100, the trajectory control system 102, the flight plan generator 702 and/or the flight control system 704 comprise one or more computing devices in accordance with implementations of computing device 900. As shown by FIG. 9, the computing device can comprise a processor 902, a memory 904, a storage device 906, an I/O interface 908, and a communication interface 910, which may be communicatively coupled by way of communication infrastructure 912. While an exemplary computing device 900 is shown in FIG. 9, the components illustrated in FIG. 9 are not intended to be limiting. Additional or alternative components may be used in other embodiments. Furthermore, in certain embodiments, a computing device 900 can include fewer components than those shown in FIG. 9. Components of computing device 900 shown in FIG. 9 will now be described in additional detail.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage device 906 and decode and execute them. In particular embodiments, processor 902 may include one or more internal caches for data, instructions, or addresses. As an example and not by way of limitation, processor 902 may include one or more instruction caches, one or more data caches, and one or more translation lookaside buffers (TLBs). Instructions in the instruction caches may be copies of instructions in memory 904 or storage device 906.

Memory 904 may be used for storing data, metadata, and programs for execution by the processor(s). Memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 904 may be internal or distributed memory.

Storage device 906 includes storage for storing data or instructions. As an example and not by way of limitation, storage device 906 can comprise a non-transitory storage medium described above. Storage device 906 may include removable or non-removable (or fixed) media, where appropriate. Storage device 906 may be internal or external to the computing device 900. In particular embodiments, storage device 906 is non-volatile, solid-state memory. In other embodiments, Storage device 906 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 908 allows a user to provide input to, receive output from, and otherwise transfer data to and receive data from computing device 900. For example, in one or more embodiments, the trajectory control system 102 can include an I/O interface 908 that enables a user to provide input, receive output, or otherwise transfer data to and receive data from a computing device 900. I/O interface 908 may include a mouse, a keypad or a keyboard, a touch screen, a camera, an optical scanner, network interface, modem, other known I/O devices or a combination of such I/O interfaces. I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 908 is configured to provide graphical data to a display for presentation to a user. The graphical data may be representative of one or more graphical user interfaces and/or any other graphical content as may serve a particular implementation.

Communication interface 910 can include hardware, software, or both. In any event, communication interface 910 can provide one or more interfaces for communication (such as, for example, packet-based communication) between computing device 900 and one or more other computing devices or networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI.

In the foregoing specification, the invention has been described with reference to specific exemplary embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method for optimizing trajectory of an unmanned aerial vehicle, the method comprising:
   identifying an initial state of an unmanned aerial vehicle ("UAV"), the initial state comprising an indication of an initial energy of the UAV and an initial position of the UAV; and
   generating an optimized flight plan for a flight time window, by:
      for a first incremental time period of the flight time window:
         identifying a plurality of possible states of the UAV after traveling during the first incremental time period from the initial state;
         calculating, for each of the plurality of possible states of the UAV at the first incremental time period, an energy change associated with transitioning to the possible state; and
         selecting a predetermined number of possible states for the first incremental time period based on the calculated energy change of each of the plurality of possible states of the UAV at the first incremental time period; and
      for each subsequent incremental time period of the flight time window:
         identifying a plurality of possible states of the UAV after traveling during the subsequent incremental time period from the selected predetermined number of possible states for a preceding incremental time period;
         calculating an energy change for each of the plurality of possible states of the UAV after traveling during the subsequent incremental time period; and
         selecting a predetermined number of possible states for the subsequent incremental time period based on the calculated energy change of each of the plurality of possible states of the UAV after the subsequent incremental time period; and
      analyzing the plurality of possible states for a final incremental time period of the flight time window to select a final state based on a final energy associated with the final state; and
      determining a flight plan for the flight time window for the UAV from the initial state to the selected final state.

2. The method of claim 1, wherein the initial state further comprises an indication of one or more initial directional offsets, an initial altitude, an initial date, an initial time, and an initial maximum energy storage capacity of the UAV.

3. The method of claim 1, further comprising determining the flight plan by:
   identifying a set of states representing a path from the initial state to the selected final state, the set of states comprising a state for each incremental time period of the flight time window; and
   identifying a set of command inputs to transition through the set of states to the final state.

4. The method of claim 3, wherein each of the set of command inputs comprise a change in heading angle of the UAV and a change in altitude of the UAV for a corresponding state from the set of states.

5. The method of claim 1, further comprising:
   identifying a predetermined containment region; and
   for each of the plurality of possible states for each incremental time period, applying a penalty to the possible state if the possible state has a position outside of the containment region.

6. The method of claim 1, wherein analyzing the plurality of possible states for the final incremental time period of the flight time window to select the final state based on the final energy associated with the final state comprises selecting a state from the plurality of possible states from the final incremental time period corresponding to a highest stored energy of the UAV at the final incremental time period.

7. The method of claim 1, wherein the calculated energy change is based on an amount of energy generated by one or more solar panels of the UAV within a corresponding incremental time period and an amount of energy utilized by the UAV within the corresponding incremental time period.

8. The method of claim 1, further comprising generating the optimized flight plan for the flight time window during active flight of the UAV.

9. The method of claim 1, wherein:
   the predetermined number is between 5 and 10;
   the flight time window is between 15 minutes and 24 hours; and
   the incremental time period is between 5 and 15 seconds.

10. The method of claim 1, wherein the initial state of the unmanned aerial vehicle is identified from a previous flight plan.

11. A system comprising:
   identifying an initial state of an unmanned aerial vehicle ("UAV"), the initial state comprising an indication of an initial energy of the UAV and an initial position of the UAV; and
   generating an optimized flight plan for a flight time window, by:
      for a first incremental time period of the flight time window:
         identifying a plurality of possible states of the UAV after traveling during the first incremental time period from the initial state;
         calculating, for each of the plurality of possible states of the UAV at the first incremental time period, an energy change associated with transitioning to the possible state; and selecting a predetermined number of possible states for the first incremental time period based on the calculated energy change of each of the plurality of possible states of the UAV at the first incremental time period; and for each subsequent incremental time period of the flight time window:

identifying a plurality of possible states of the UAV after traveling during the subsequent incremental time period from the selected predetermined number of possible states for a preceding incremental time period;

calculating an energy change for each of the plurality of possible states of the UAV after traveling during the subsequent incremental time period; and selecting a predetermined number of possible states for the subsequent incremental time period based on the calculated energy change of each of the plurality of possible states of the UAV after the subsequent incremental time period; and analyzing the plurality of possible states for a final incremental time period of the flight time window to select a final state based on a final energy associated with the final state; and determining a flight plan for the flight time window for the UAV from the initial state to the selected final state.

12. The system of claim 11, wherein the initial state further comprises an indication of an east directional offset, a north directional offset, an altitude, a heading angle, a date, a time, and a maximum energy storage capacity of the UAV.

13. The system of claim 11, further comprising determining the flight plan by:

identifying a set of states representing a path from the initial state to the selected final state, the set of states comprising a state for each incremental time period of the flight time window; and identifying a set of command inputs to transition through the set of states to the final state.

14. The system of claim 13, wherein each of the set of command inputs comprise a change in heading angle of the UAV and a change in altitude of the UAV for a corresponding state from the set of states.

15. The system of claim 11, wherein the calculated energy change is based on an amount of energy generated by one or more solar panels of the UAV within a corresponding incremental time period and an amount of energy utilized by the UAV within the corresponding incremental time period.

16. A non-transitory computer-readable medium storing instructions that, when executed by at least one processor, cause a computing device to:

identify an initial state of an unmanned aerial vehicle ("UAV"), the initial state comprising an indication of an initial energy of the UAV and an initial position of the UAV; and generate an optimized flight plan for a flight time window, by:

for a first incremental time period of the flight time window:

identifying a plurality of possible states of the UAV after traveling during the first incremental time period from the initial state;

calculating, for each of the plurality of possible states of the UAV at the first incremental time period, an energy change associated with transitioning to the possible state; and selecting a predetermined number of possible states for the first incremental time period based on the calculated energy change of each of the plurality of possible states of the UAV at the first incremental time period; and for each subsequent incremental time period of the flight time window:

identifying a plurality of possible states of the UAV after traveling during the subsequent incremental time period from the selected predetermined number of possible states for a preceding incremental time period;

calculating an energy change for each of the plurality of possible states of the UAV after traveling during the subsequent incremental time period; and selecting a predetermined number of possible states for the subsequent incremental time period based on the calculated energy change of each of the plurality of possible states of the UAV after the subsequent incremental time period; and analyzing the plurality of possible states for a final incremental time period of the flight time window to select a final state based on a final energy associated with the final state; and determining a flight plan for the flight time window for the UAV from the initial state to the selected final state.

17. The computer-readable medium of claim 16, wherein the initial state further comprises an indication of an east directional offset, a north directional offset, an altitude, a date, a time, and a maximum energy storage capacity of the UAV.

18. The computer-readable medium of claim 16, further comprising instructions that when executed by the at least one processor, cause the computing device to determine the flight plan by:

identifying a set of states representing a path from the initial state to the selected final state, the set of states comprising a state for each incremental time period of the flight time window; and identifying a set of command inputs to transition through the set of states to the final state.

19. The computer-readable medium of claim 18, wherein each of the set of command inputs comprise a change in heading angle of the UAV and a change in altitude of the UAV for a corresponding state from the set of states.

20. The computer-readable medium of claim 16, wherein the calculated energy change is based on an amount of energy generated by one or more solar panels of the UAV within a corresponding incremental time period and an amount of energy utilized by the UAV within the corresponding incremental time period.

* * * * *